(12) United States Patent
Sharma et al.

(10) Patent No.: US 7,457,277 B1
(45) Date of Patent: Nov. 25, 2008

(54) SYSTEM AND METHOD FOR NETWORK LAYER PROTOCOL ROUTING IN A PEER MODEL INTEGRATED OPTICAL NETWORK

(75) Inventors: Vishal Sharma, Mountain View, CA (US); Abhimanyu Das, Petaluma, CA (US); Charles Chen, Santa Rosa, CA (US)

(73) Assignee: Mahi Networks, Inc., Petaluma, CA (US)

( * ) Notice: Subject to any disclaimer, the term of this patent is extended or adjusted under 35 U.S.C. 154(b) by 1045 days.

(21) Appl. No.: 10/392,621

(22) Filed: Mar. 19, 2003

Related U.S. Application Data

(60) Provisional application No. 60/412,385, filed on Sep. 20, 2002.

(51) Int. Cl.
*H04L 12/28* (2006.01)
*H04L 12/54* (2006.01)
*H04J 3/16* (2006.01)

(52) U.S. Cl. .................. 370/351; 370/429; 370/395.51; 370/469

(58) Field of Classification Search .................. 370/389, 370/390, 352, 250, 252, 254, 216, 218, 314, 370/366, 395.2, 392, 386, 255, 256, 465, 370/466, 467, 351, 396, 395.1, 395.5, 395.51, 370/902; 709/238, 239
See application file for complete search history.

(56) References Cited

U.S. PATENT DOCUMENTS

| | | | | |
|---|---|---|---|---|
| 6,147,976 A | * | 11/2000 | Shand et al. | 370/254 |
| 6,711,155 B1 | * | 3/2004 | Himbeault et al. | 370/352 |
| 6,928,483 B1 | * | 8/2005 | Cain | 709/238 |
| 6,950,427 B1 | * | 9/2005 | Zinin | 370/386 |
| 7,065,059 B1 | * | 6/2006 | Zinin | 370/312 |
| 7,079,493 B2 | * | 7/2006 | Nakamichi et al. | 370/252 |
| 7,126,921 B2 | * | 10/2006 | Mark et al. | 370/242 |
| 7,161,932 B1 | * | 1/2007 | Watts | 370/352 |
| 7,315,897 B1 | * | 1/2008 | Hardee et al. | 709/229 |

OTHER PUBLICATIONS

V. Sharma et al., "Leveraging IP signaling and routing to manage UPSR-based SONET networks", submitted ICC 2003, Aug. 2002.

D. Katz et al., "Traffic egineering extensions to OSPF version 2", draft-katz-yeung-ospf-traddic-09.txt, www.ietf.org/internet-drafts/draft-katz-yeung-opsf-traffic-09.txt, Aug. 2002.

K. Kompela et al., "OSPF extensions in support of Generalized MPLS", draft-ietf-ccamp-ospf-gmpls/extensions-08.txt, www.ietf.org/internet-drafts/draft-ietf-ccamp-ospf-gmpls-extensions-08.txt, Aug. 2002.

(Continued)

*Primary Examiner*—Hanh Nguyen
(74) *Attorney, Agent, or Firm*—Blakely, Sokoloff, Taylor & Zafman

(57) ABSTRACT

Embodiments of the invention are generally directed to a system and method of implementing peer model architecture in integrated optical networks. In one embodiment, heterogeneous domains of nodes share a common control plane via routing and signaling adjacencies established through a network layer control channel. For example, in one embodiment, one or more Internet Protocol (IP) compliant routers, one or more Time Domain Multiplexing (TDM) switches, and one or more Wave Division Multiplexing (WDM) optical cross connects (OXC) run a common instance of an Interior Gateway Protocol (IGP).

22 Claims, 16 Drawing Sheets

OTHER PUBLICATIONS

L. Berger, "Generalized MPLS: Singnaling—RSVP-TE extensions", draft-ietf-mpls/generalized-rsvp-te-08.txt, www.ietf.org/internet-drafts/draft-ietf-mpls-generalized-rsvp-te/08.txt, Aug. 2002.

* cited by examiner

US 7,457,277 B1

SYSTEM AND METHOD FOR NETWORK LAYER PROTOCOL ROUTING IN A PEER MODEL INTEGRATED OPTICAL NETWORK

RELATED APPLICATIONS

This nonprovisional patent application claims the benefit of priority under 35 U.S.C. §119(e) of U.S. Patent Application Ser. No. 60/412,385, entitled, "System and Method of Implementing Peer Model in Integrated Optical Networks," filed on Sep. 20, 2002.

This nonprovisional patent application is related to contemporaneously filed nonprovisional patent application Ser. No. 10/392,651 entitled "A System and Method for Implementing A Peer Model Architecture in Integrated Optical Networks," contemporaneously filed nonprovisional patent application Ser. No. 10/392,647 entitled "A System and Method for Routing Information in a Peer Model Integrated Optical Network," and contemporaneously filed nonprovisional patent application Ser. No. 10/392,548 entitled "System and Method for Switching in a Peer Model Integrated Optical Network."

TECHNICAL FIELD

Embodiments of the invention generally relate to the field of integrated optical networks and, more particularly, to a system and method for implementing peer model architecture in integrated optical networks.

BACKGROUND

FIG. 1 is a block diagram illustrating selected elements of conventional network 100. Conventional network 100 includes one or more Internet Protocol (IP) routers (e.g., IP router 110) surrounding a domain 120 of circuit providing elements (e.g., switch 130). The IP routers and circuit providing elements are connected together by a number of links (e.g., link 140 and 150). A link is a physical or logical connection between two points capable of transporting digitally encoded voice and data traffic.

The circuit providing elements within domain 120 may be Asynchronous Transfer Mode (ATM) switches, Time Domain Multiplexing (TDM) switches, Wavelength Division Multiplexing (WDM) optical cross-connects (OXCs), or the like. The term "switch" may refer to an ATM switch, a WDM cross-connect, a TDM switch or similar circuit providing element. Typically, domain 120 comprises an optical layer of conventional network 100 and the one or more IP routers (e.g., IP router 110) comprise an electrical layer of conventional network 100. The optical layer's primary function may be to provide circuit services to the one or more IP routers. Circuit services refer to services provided to nodes to establish temporary connections between the nodes.

FIG. 2 is a block diagram illustrating the logical decomposition of IP router 210 and TDM switch 220. IP router 210 and TDM switch 220 may be logically decomposed into a control plane, a management plane, and a forwarding plane. The logical decomposition of IP router 210 and TDM switch 220 into these three planes provides a means for network engineers to more easily design networks comprising nodes of different switching technologies.

The term control plane refers to the entities involved in the functions of signaling and routing within a network. Signaling is the process of exchanging control messages between network nodes and is typically used for dynamic connection set-up across a network. Routing refers to adjacency discovery, propagation of reachability information, path calculation, path selection process and the like. Control plane entities may include control plane processors 241 and 243, various software processes, and the like.

The term management plane refers to the entities involved in the functions of configuring and managing a node (e.g., IP router 210 and TDM switch 220). The management functions may relate to management of devices, of the networking layer, of services, or the like. Management plane entities may include management processors 251 and 253. A person of ordinary skill in the art will recognize that a single processor may be used to perform both control plane functions and management plane functions.

The term forwarding plane refers to the entities involved in the manipulation and forwarding of digitally encoded voice and data. Examples of forwarding plane entities include line cards (e.g., line cards 255 and 257), Forwarding Information Bases (not shown), and the like.

Referring again to FIG. 1, the IP routers and the circuit providing elements form two distinct domains (e.g., an IP domain and a transport domain). The routing, topology distribution, and signaling protocols in the IP domain are independent of the routing, topology distribution, and signaling protocols in the transport domain. Since the IP domain and the transport domain run separate instances of routing and signaling protocol processes, the control plane of the IP domain is independent of the control plane of the transport domain.

In the past few years, there has been significant interest within the industry to move towards a unified set of mechanisms that will enable service providers to manage separate network elements in a uniform way. Such a unified set of mechanisms is central to managing a network composed of a wide range of elements, from IP routers, to Synchronous Optical Network/Synchronous Digital Hierarchy (SONET/SDH) cross connects, to optical cross-connects. The traditional transport network, for example, has so far not had such a common framework. Indeed, the SONET network infrastructure does not have any control plane at all (it has only a management infrastructure) because the need for automatic provisioning was not envisioned when SONET/SDH networks were initially developed. As the extent of SONET networks grew, however, the manual provisioning process became increasingly slow and often error prone, motivating the need for a better solution. In parallel, the Internet Protocol (IP) and its associated protocols have matured to become the ubiquitous routing and signaling mechanisms for transporting packet data. Further, this packet infrastructure also has evolved to introduce the idea of decoupling routing from packet forwarding (via multi-protocol label switching, for example), thus allowing for virtual circuit setup and traffic engineering in packet networks.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
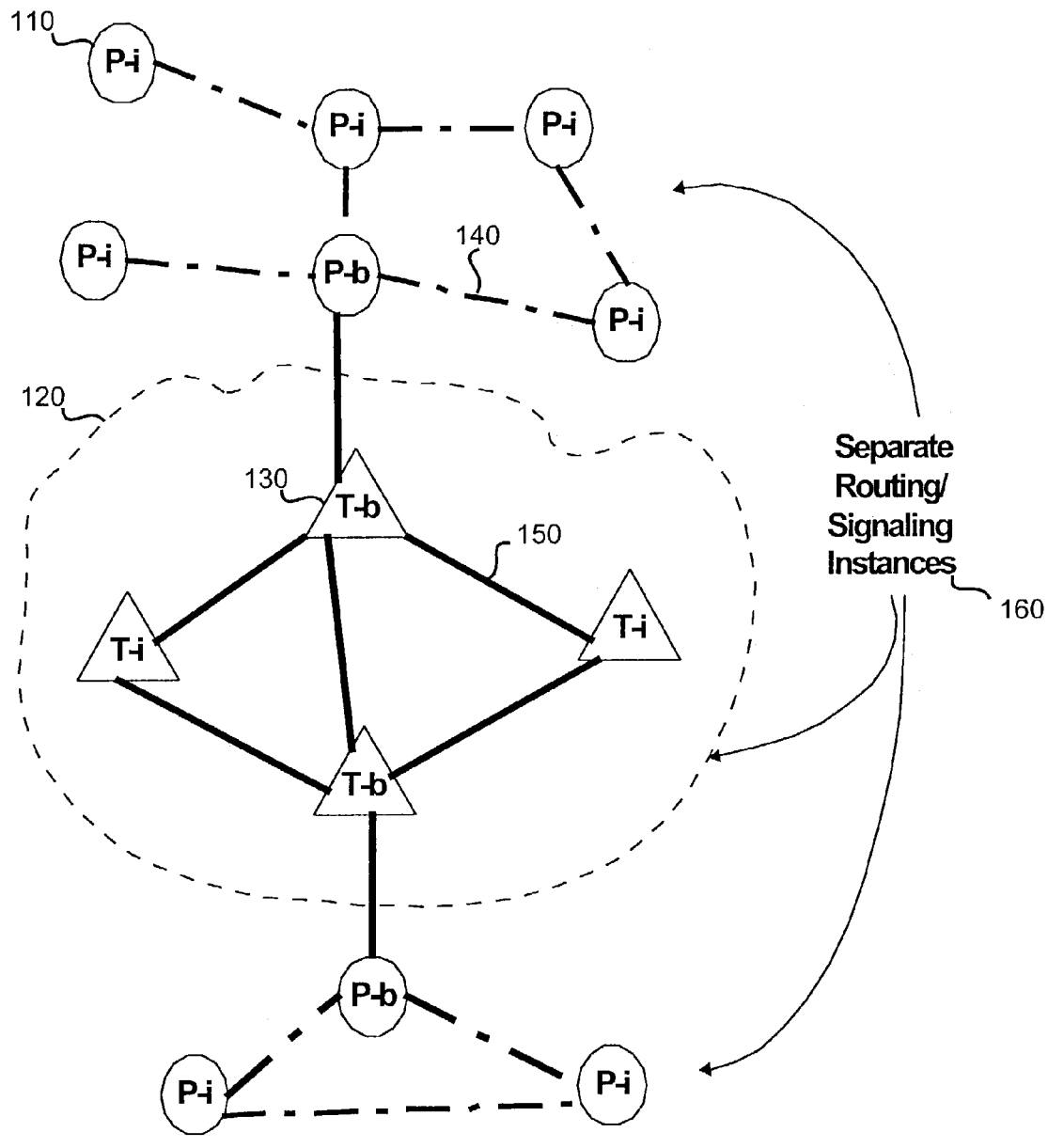
FIG. 1 is a block diagram illustrating selected elements of conventional network 100.
Figure 2:
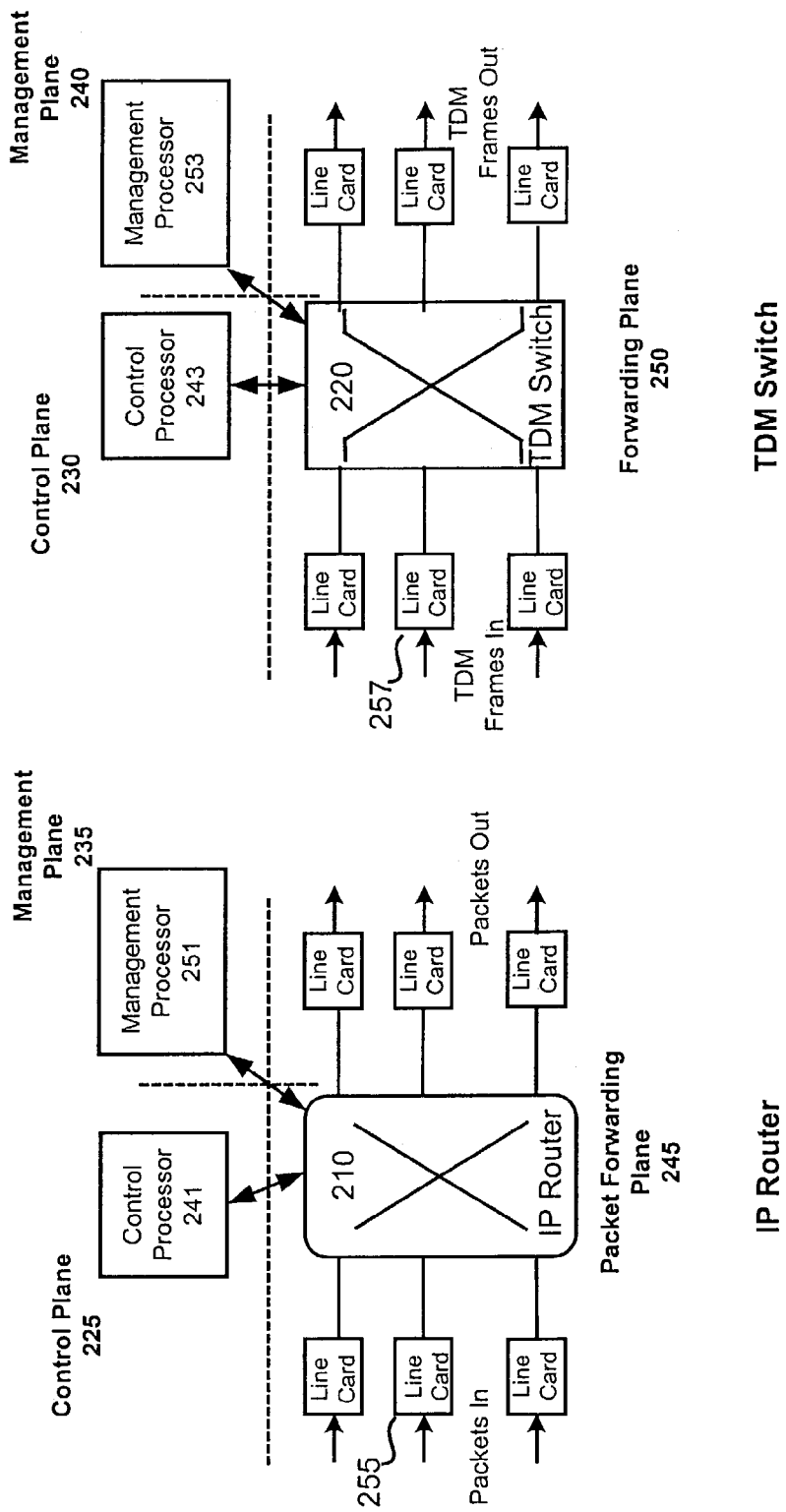
FIG. 2 is a block diagram illustrating the logical decomposition of an IP router 210 and a TDM switch 220.

Embodiments of the invention are generally directed to a system and method of implementing peer model architecture in integrated optical networks. In one embodiment, heterogeneous domains of nodes share a common control plane via routing and signaling adjacencies established through a network layer control channel. For example, in one embodiment, one or more Internet Protocol (IP) compliant routers, one or more Time Domain Multiplexing (TDM) switches, and one or more Wave Division Multiplexing (WDM) optical cross connects (OXC) run a common instance of an Interior Gateway Protocol (IGP). Table 1 provides a number of definitions and descriptions to facilitate disclosure of embodiments of the invention.

TABLE 1

| Term | Definition/Description |
| --- | --- |
| P (or packet) node | A P node may be an IP router or the hardware and software within a hybrid system that realizes IP router functionality. A P node may be either a physical or logical system that functions as an IP router. |
| T (or TDM) node | A T node may be a TDM switch or the hardware and software within a hybrid system that realizes TDM switch functionality. A T node may be either a physical or logical system that functions as a TDM switch. |
| W node | A W node is a WDM optical cross connect or the hardware and software within a hybrid system that realizes WDM optical cross connect functionality. A W node may be either a physical or logical system that functions as a WDM optical cross connect. |
| P (or packet) link | A P link may be a physical or logical link that connects two P nodes. |
| T (or TDM) link | A T link may be a physical link that connects two T nodes. Also, A T link may be a physical link that connects a T node with a P node. |
| W (or WDM) link | A W link may be a physical link that connects two W nodes. Also, A W link may be a physical link that connects a W node with a P node. |
| IP control channel (IPCC) link | An IPCC link may be an in-band or out-of-band data communication channel that connects each pair of devices that have a TDM link or WDM link between them. The IPCC link may be used to transmit IP routing and signaling messages. In one embodiment of the invention, an IPCC link is used to connect a TDM switch with one of an IP router and a TDM switch. |
| P domain | A P domain is one or more P nodes that run a single instance of the IP routing and signaling protocols. |
| T domain | A T domain is one or more T nodes that run a single instance of the IP routing and signaling protocols. |
| W domain | A W domain is one or more W nodes that run a single instance of the IP routing and signaling protocols. |

Embodiments of the invention described herein use IP based signaling and routing protocols to dynamically control and manage end-to-end data flow in heterogeneous multi-layer networks, which include IP, TDM, and WDM based equipment. For the IP routing and signaling messages to flow between these network nodes, either an in-band or an out-of-band IP control channel may link every pair of nodes connected by a data bearing link. Thus, to dynamically control end-to-end data flow, it is desirable for a network to have a unified IP based control plane and a layered forwarding plane comprised of a mixture of IP, TDM, and WDM forwarding planes.

Peer Model Architecture

In a network having a unified IP based control plane, an IP router may be a peer of a TDM switch (or a WDM OXC). Therefore, such networking architecture may be called "peer model architecture." In peer model architecture, IP routers and TDM switches may be connected to each other in the control plane via routing and signaling adjacencies over an IP control channel (IPCC). According to the peer model, a single instance of the IP based signaling and routing stacks (with optics-based extensions) may be run on both IP routers and TDM switches (or WDM OXCs). Since a single instance of signal and routing stacks is utilized, routers may compute and signal end-to-end paths across an optical transport domain.

To distribute topology information through a network implemented according to peer architecture, a common instance of an Interior Gateway Protocol (IGP) may be used throughout an integrated network. An IGP is a protocol that defines how routers (and also TDM switches and OXC) within an autonomous system communicate with each other. Three example IGPs are the Routing Information Protocol (RIP), the Open Shortest Path First Protocol (OSPF), and the Intermediate System to Intermediate System (IS-IS) protocol.

Since nodes within a peer type network run a common instance of an IGP, it may be desirable for those nodes to share a common address space. The term common address space refers to all nodes within the peer type network having a unique address. In one embodiment of the invention, all nodes within a peer type network have unique IP addresses. According to such an embodiment, an IP address may belong to either a TDM switch or an IP router but it cannot belong to both devices.

Figure 3:
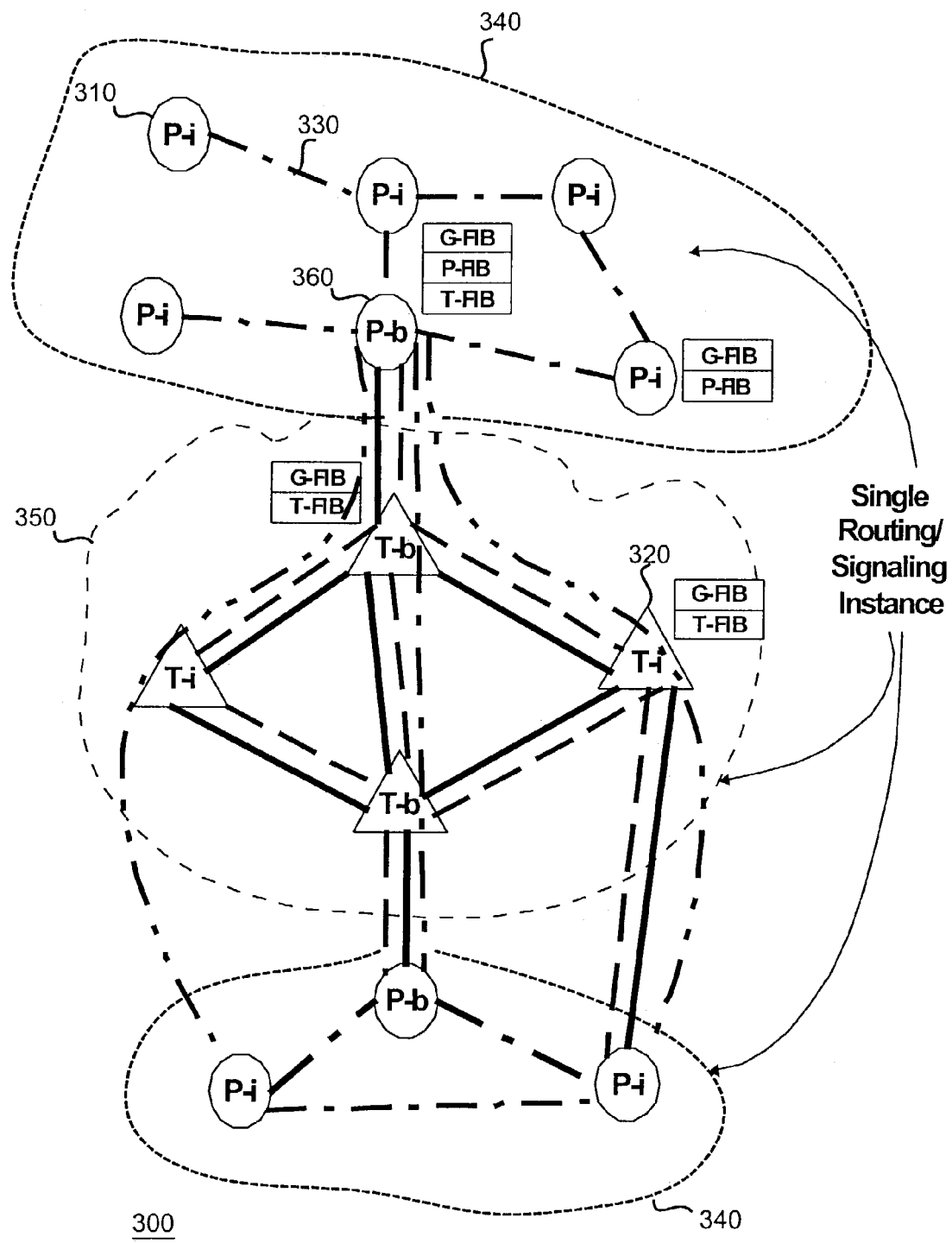
FIG. 3 is a block diagram illustrating selected elements of network 300 implementing certain aspects of the invention.

FIG. 3 is a block diagram illustrating one embodiment of selected elements of network 300, implemented according to an embodiment of the invention. Network 300 may include one or more P nodes (e.g., P node 310) and one or more T nodes (e.g., T node 320), connected together by one or more physical (and/or logical) links (e.g., P-link 330). A P node may be an IP router or the hardware and software within a hybrid system that realizes IP router functionality. A T node may be a TDM switch or the hardware and software within a hybrid system that realizes TDM switch functionality.

Network 300 comprises P domain 340 and T domain 350. The term domain, as used herein, refers to one or more nodes running a common instance of a routing protocol (and/or a signaling protocol). A P domain (e.g., P domain 340) refers to a domain of P nodes. Similarly, a T domain (e.g., T domain 350) refers to a domain of T nodes. Alternative embodiments of the invention may comprise a P domain and a W domain. Also, some alternative embodiments of the invention may comprise three or more domains (e.g., a P domain, a T domain, and a W domain).

As shown in FIG. 3, the forwarding planes of P nodes in a peer type network may be fully connected, making the packet network topology an overly of the physical transport network. Thus, "peering" between IP devices and TDM/optical devices is typically in the control and management planes. The unification of the control and management planes increases the interaction between the IP and TDM/optical domains by allowing for a single management interface that can control both the IP and TDM/optical domains.

Figure 4:
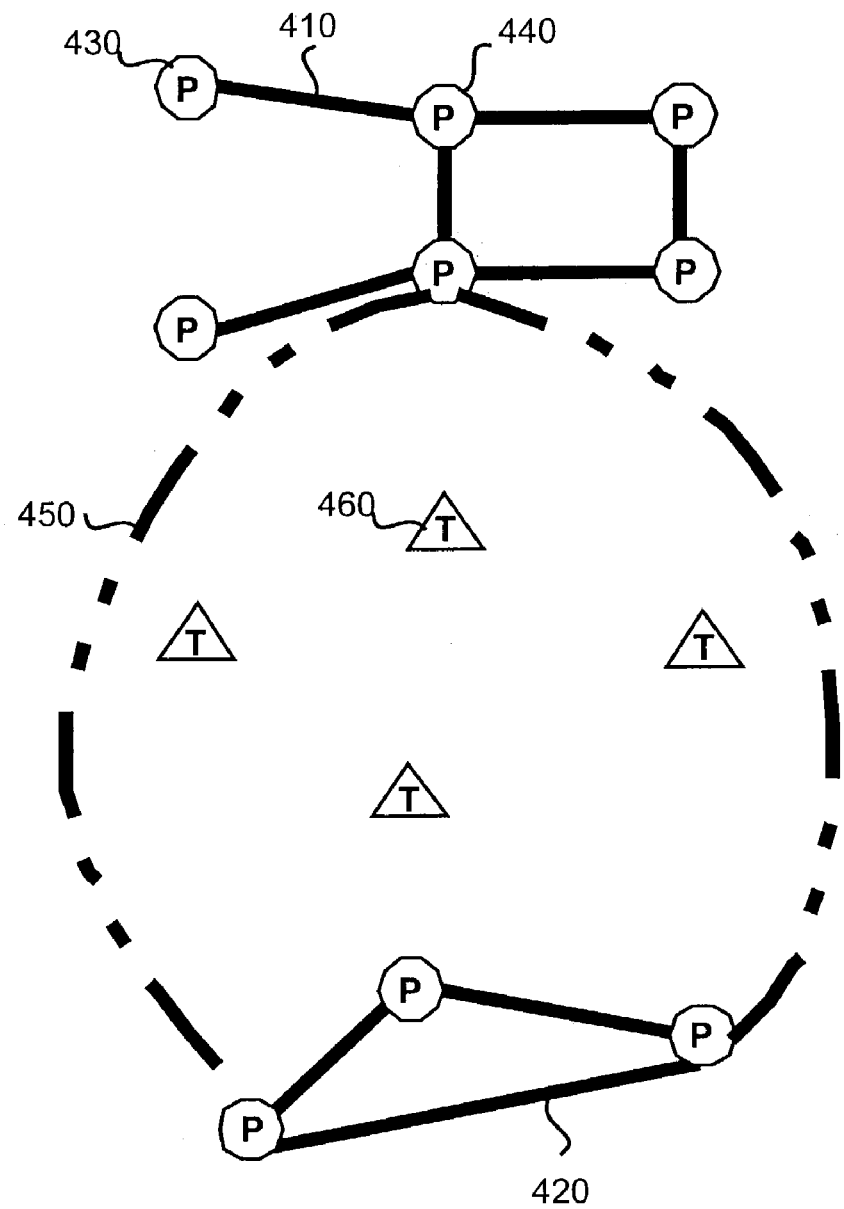
FIG. 4 is an illustration of the P domain topology of network 300.

FIG. 4 is a block diagram illustrating the P domain topology of network 300. The P domain may include one or more P nodes (e.g., P nodes 430 and 440) and one or more P links (e.g., P links 410 and 450). A P link may be a physical link (e.g., P link 410) or a logical link (e.g., P link 450). P links may carry data, control, and management packets. As will be further discussed below, the P domain topology may be used to generate a P link-Forwarding Information Base (P-FIB).

Figure 5:
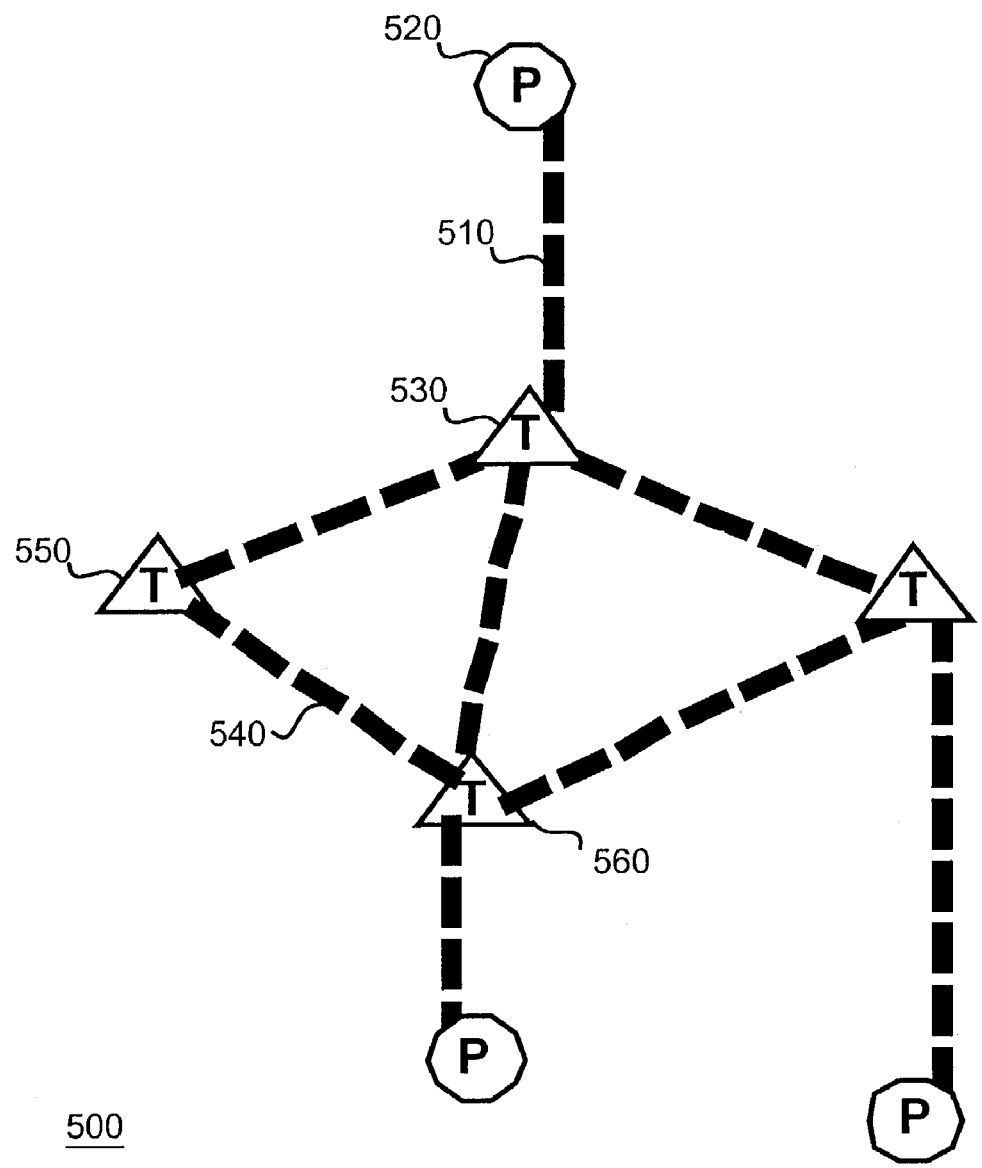
FIG. 5 is an illustration of the IPCC topology of network 300.

FIG. 5 is a block diagram illustrating the Internet Protocol Control Channel (IPCC) topology of network 300. An IPCC may be an in-band or out-of-band data communication channel that connects each pair of devices that share a T link. For example, IPCC 510 connects P node 520 and T node 530. Similarly, IPCC 540 connects T node 550 with T node 560. As will be further described below, the IPCC topology may be used to generate an IPCC link-Forwarding Information Base (T-FIB).

Figure 6:
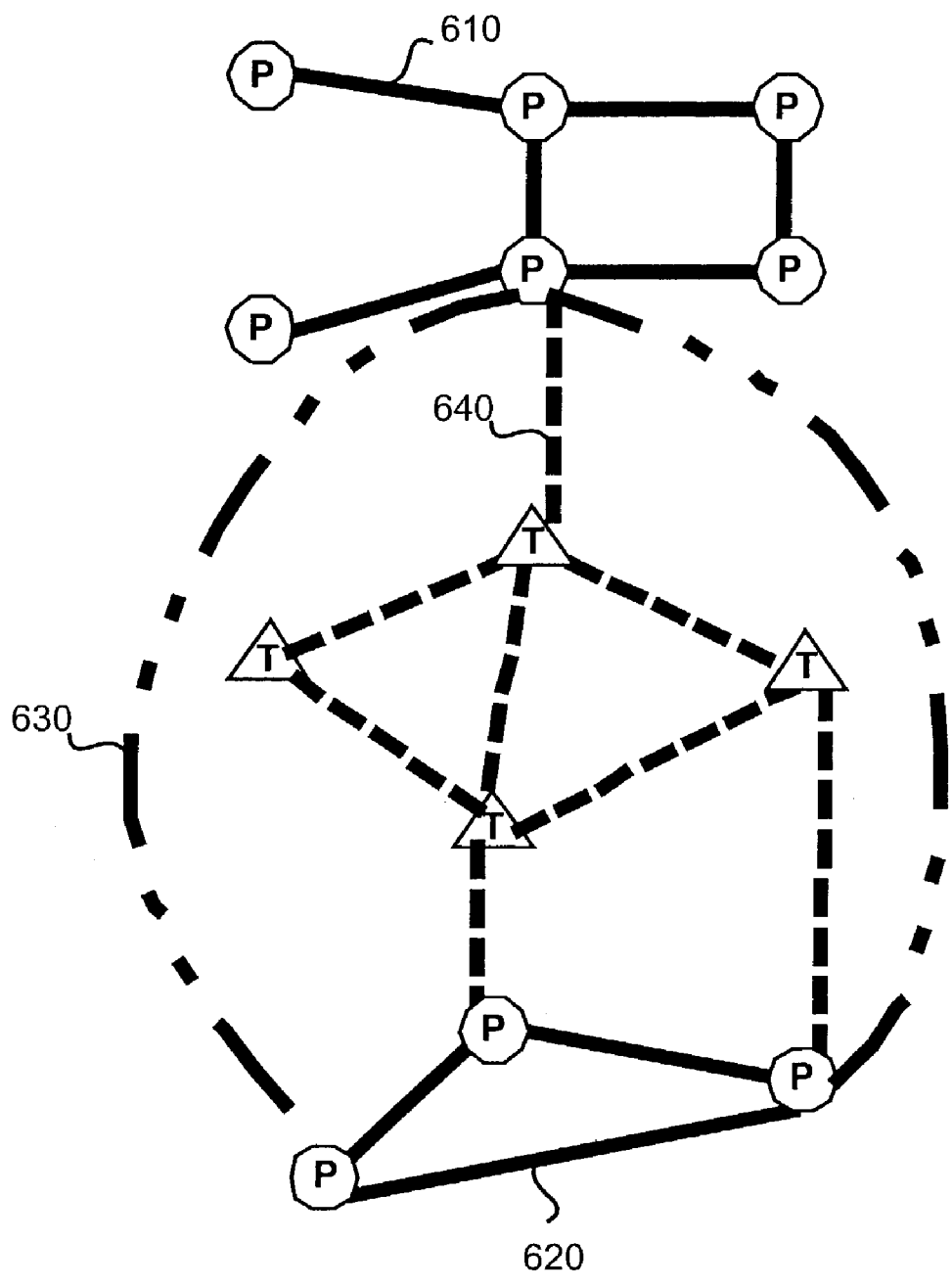
FIG. 6 is an illustration of the IP topology of network 300.

FIG. 6 is a block diagram illustrating the IP topology of network 300. In peer type networks, the IP topology may include all of the nodes within the peer network and the P links and IPCC links connecting those nodes. For the embodiment illustrated in FIG. 3, the IP topology may be based on the union of the P domain topology (shown in FIG. 4) with the IPCC topology (shown in FIG. 6). Thus, the IP topology of network 300 includes physical P links (e.g., P links 610 and 620), logical P links (e.g., P link 630), and IPCC links (e.g., IPCC 640). As will be further discussed below, the IP topology may be used to generate a global-Forwarding Information Base (G-FIB).

Forwarding is the process of passing a packet or message on to an intermediate or final destination. Forwarding may involve a number of processes including IGPs, Link State Databases (LSDBs), Forwarding Information Bases (FIBs), and Constrained Shortest Path First (CSPF) algorithms. While forwarding will be described in connection with link state protocols (e.g., OSPF), a person of ordinary skill in the art will appreciate that embodiments of the invention may be implemented using other types of routing protocols including distance-vector protocols.

Network nodes employing link state protocols (e.g., OSPF or IS-IS) typically maintain a partial map of the network in which they reside. When a network link changes state (e.g., up to down, or vice versa), a notification, called a Link State Advertisement (LSA) message may be flooded throughout the network. An LSA message may be a wide variety of messages implemented according to a routing protocol to convey information about the state of one or more links.

A Link State Database (LSDB) is a data structure maintained in a node (e.g., P node 310 and T node 320 shown in FIG. 3) based on information obtained from received LSA messages. Forwarding Information Bases (FIBs) may be derived from the LSDBs. The derivation of FIBs from LSDBs is well known in the art and will not be further discussed except as to how it pertains to embodiments of the invention.

The forwarding of packets at a node is based on the FIB. Conventional nodes use the destination address of the packet to extract from the FIB the identity of the outgoing interface to which the packet should be forwarded. Conventional nodes may also direct certain packets (e.g., control and management packets) to one more control processors within the node. Processors in the forwarding plane of the receiving node may identify the control and management packets. The control processor(s) may hand the packet to the appropriate software process (e.g., an OSPF or Resource Reservation Protocol process) responsible for processing that specific type of packet.

Within an IP router, the FIB may be located on one or more line cards so data packets typically only travel through the packet forwarding plane. Control and management packets, however, are directed from the line card to the control/management processor(s). In a TDM switch, on the other hand, the only IP packets typically arriving are control/management packets, and these are directed from the line card to the control/management processor(s) for further processing.

Referring again to FIG. 3, since a single IGP instance runs in multiple domains (e.g., P domain 340 and T domain 350), nodes within network 300 may selectively forward packets to different domains. As will be more fully described below in connection with FIGS. 8 and 10, packet forwarding may depend, in part, on the domain in which a destination node resides and the type of packet that is to be forwarded. In some embodiments of the invention, particular types of packets are to be routed over particular types of links. Therefore, nodes in network 300 may have to consider multiple network topologies (e.g., P domain topology 400, IPCC topology 500, and IP topology 600), during packet forwarding.

In some embodiments of the invention, each node maintains a mapping (e.g., a data structure with entries providing a mapping) of IP address-to-domain in which the node with that IP address resides (IP address-to-domain mapping). In some embodiments of the invention, this mapping is accomplished through domain information that is carried in Link State Advertisement messages that are flooded throughout a network. In alternative embodiments of the invention, the mapping is manually configured at each node within the network. As will be further described below with respect to FIGS. 8 and 10, the IP address-to-domain mapping may be used by P nodes and T nodes when forwarding packets.

In some embodiments of the invention, incoming packets may be one of four packet types: IP data packets, control packets (e.g., routing and signaling packets), management packets, and ping packets. Also, in some embodiments of the invention, incoming packets may be viewed as belonging to one of eight traffic classes: IP data traffic, routing traffic, P- or T-domain destined signaling traffic, P- or T-domain destined management traffic, and P- or T-domain destined ping packets. The traffic class of a packet may be a function of its packet type and the domain in which the destination node resides. The use of traffic classes in packet forwarding will be further described below in connection with FIGS. 8 and 10.

P Node Architecture and Processes

Figure 7:
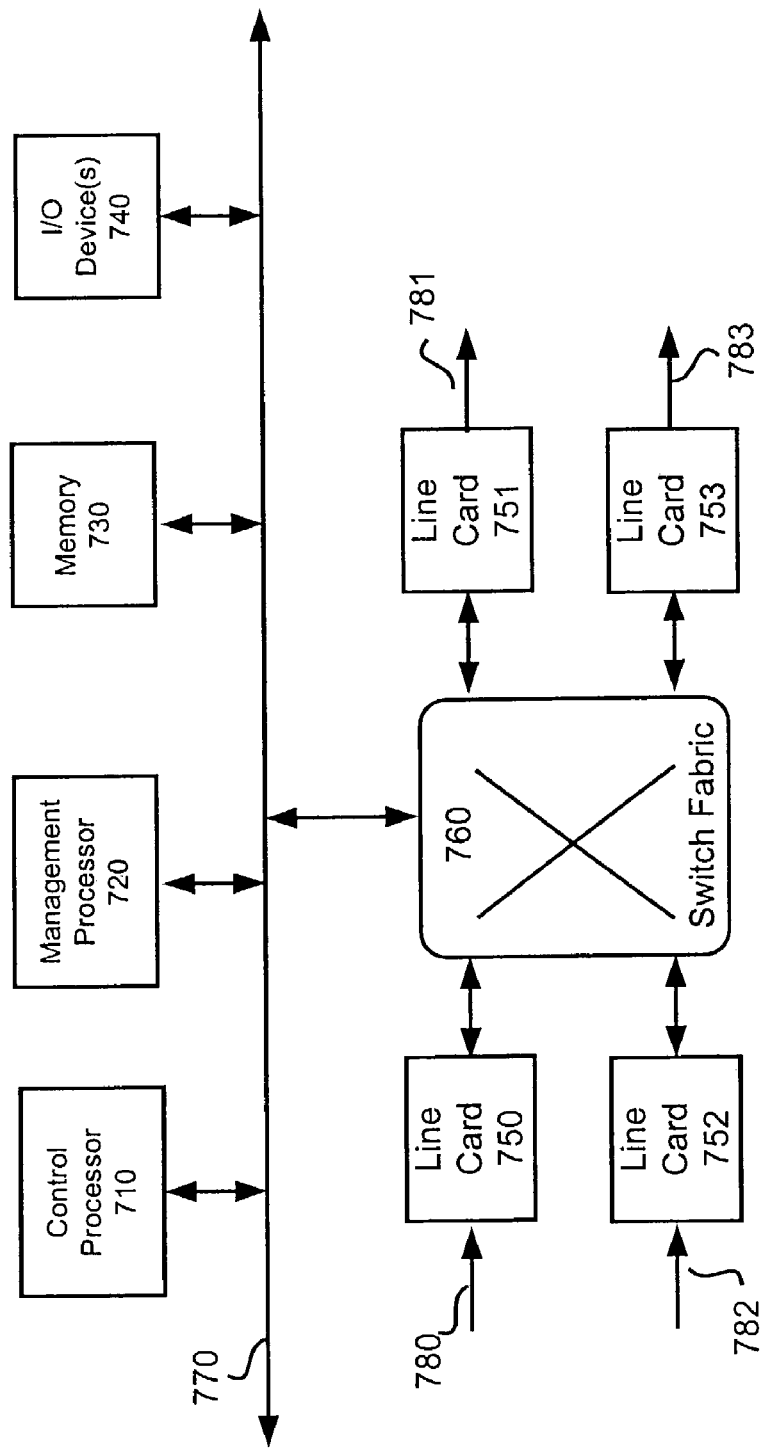
FIG. 7 is a block diagram illustrating selected elements of P node 700.

FIG. 7 is a block diagram illustrating selected elements of P node 700. P node 700 may include: one or more control processors 710, one or more management processors 720, memory 730, one or more Input/Output interfaces 740, line cards 750-753, and switch fabric 760. The illustrated elements may be connected together through system interconnect 770. One or more control processors 710 and one or more management processors 720 may include a microprocessor, microcontroller, field programmable gate array (FPGA), application specific integrated circuit (ASIC), central processing unit (CPU), programmable logic device (PLD), and similar devices that access instructions from system storage (e.g., memory 730), decode them, and execute those instructions by performing arithmetic and logical operations. In some embodiments of the invention, one or more control processors 710 and one or more management processors 720 are implemented with a common processor or processors.

Memory 730 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 730 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 730 may store program modules such as routines, programs, objects, images, data structures, program data, and other program components that perform particular tasks or implement particular abstract data types that facilitate system use.

Line cards 750-753 provide an interface between communication channels 780-783 and other elements of P node 700. Line cards 750-753 represent a broad range of interface elements capable of providing transmitting and/or receiving ports connecting P node 700 to communication channels 780-783. A person of ordinary skill in the art will appreciate that the number of line cards in P node 700 may be fewer or greater than the number shown in FIG. 7.

Switch fabric 760 provides the interconnect architecture used to switch packets from incoming communication channels (e.g., 780 and 782) with outgoing communication channels (e.g., 781 and 783). Switch fabric 760 represents a wide array of interconnect architectures capable of packet switching. Switch fabrics are well known in the art and, therefore, will not be further described except as to embodiments of the invention.

One or more I/O interfaces 740 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnect 770 permits communication between the various elements of P node 700. System interconnect 770 may include a wide variety of signal lines including one or more of a memory bus, peripheral bus, local bus, host bus, bridge, optical, electrical, acoustical, and other propagated signal lines.

P node 700 may receive one or more Link State Advertisement (LSA) messages (e.g., via communication channels 780 and 782) containing information about one or more links that are in the same network as P node 700. In embodiments of the invention employing a link-state routing protocol, P node 700 may maintain one or more Link State Databases (LSDBs) containing information from the one or more received LSA messages.

P node 700 maintains two or more FIBs (derived from the one or more LSDBs) depending on whether P node 700 is an interior P node or an exterior P node. An interior P node is a P node that is not connected by a link to a node from another domain (e.g., P node 310 shown in FIG. 3). An exterior P node is a P node that is connected by one or more links to a node from a different domain (e.g., P node 360 shown in FIG. 3).

In some embodiments of the invention, P node 700 maintains separate LSDBs for LSA messages pertaining to P links and LSA messages pertaining to IPCC links. In such embodiments, P node 700 may derive separate FIBs for each LSDB it maintains. In alternative embodiments of the invention, P node 700 maintains a global LSDB and generates separate FIBs by running a CSPF algorithm on subsets of a global LSDB.

In either case, P node 700 may generate three different FIBs: a P link-FIB (P-FIB), an IPCC link-FIB (T-FIB), and a global-FIB (G-FIB). The P-FIB is derived from LSA messages pertaining to P links, the T-FIB is derived from LSA messages pertaining to IPCC links, and the G-FIB is derived from a union of the LSA messages pertaining to P links with the LSA messages pertaining to IPCC links.

In an embodiment of the invention, an interior P node maintains a P-FIB and a G-FIB, while a border P node also maintains a T-FIB in addition to the P-FIB and the G-FIB. This is because, in an embodiment of the invention, an interior P node uses the P-FIB to forward IP data packets and a G-FIB to forward management plane and routing traffic. The border P node may maintain a T-FIB to route signaling packets (for setting up a forwarding adjacency) over the TDM infrastructure, in an embodiment of the invention.

Figure 8:
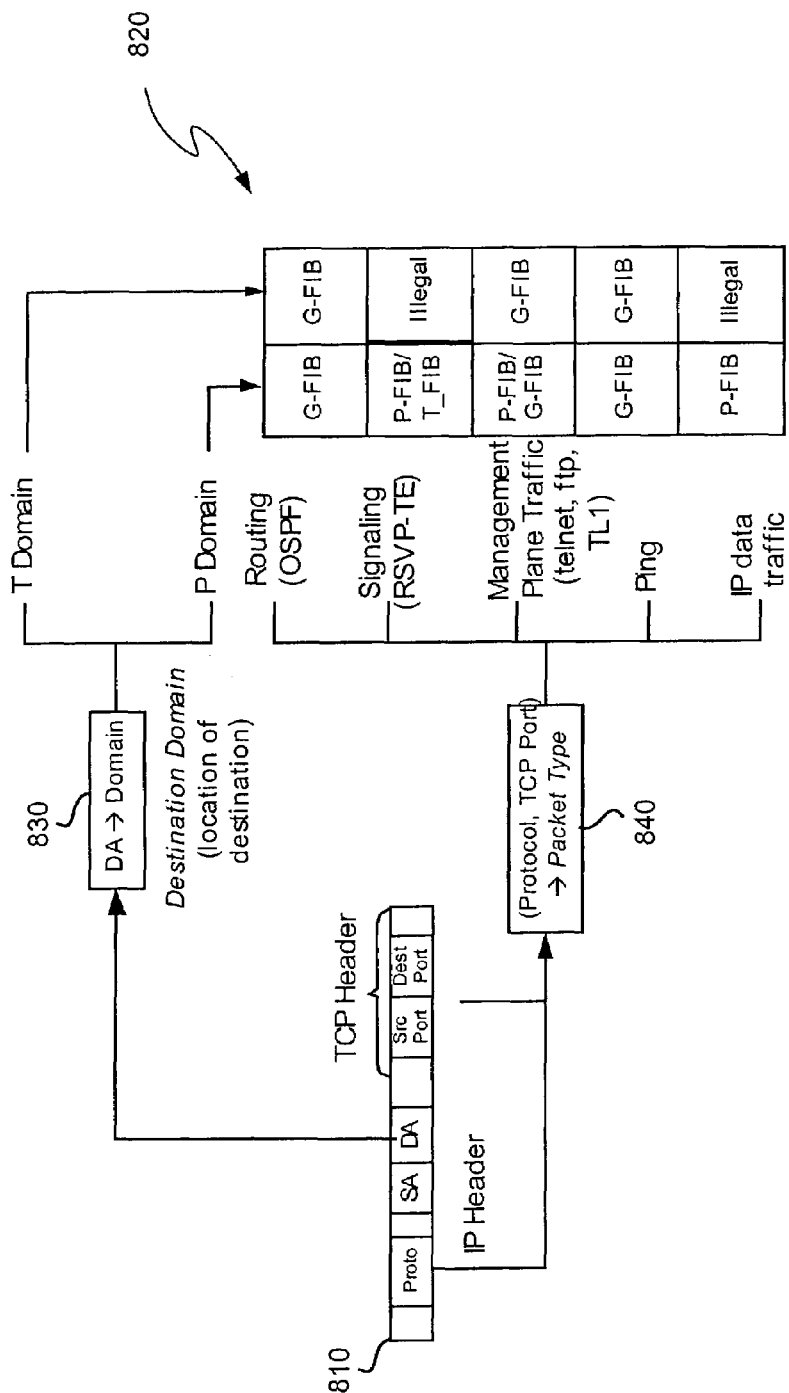
FIG. 8 is an illustration of packet classification and processing within a P node.

FIG. 8 illustrates how an embodiment of P node 700 classifies and forwards various types of packets. FIG. 8 shows packet header 810, table 820, obtained domain information 830, and obtained packet type 840. In some embodiments of the invention, P node 700 classifies received packets based on information obtained from the IP and Transmission Control Protocol (TCP) (or User Datagram Protocol) headers of the packet. Specifically, some embodiments of the invention, determine the traffic class of a packet based on the domain in which the destination node resides and the packet type.

On receiving a packet, P node 700 may determine in which domain the destination node resides. In some embodiments of the invention, P node 700 may determine the IP address of the destination node from the IP header as illustrated at reference numeral 830. The obtained destination IP address may then be compared to a mapping of IP addresses-to-domains to determine in which domain the destination node resides.

The IP address-to-domain mapping may be automatically generated in some embodiments of the invention based on information obtained from LSA messages. In alternative embodiments, the IP address-to-domain mapping may be manually configured at each node. Generating the IP address-to-domain mapping will be further described below in connection with routing protocol enhancements.

In the embodiment of the invention illustrated in FIG. 8, the destination domain is either a T domain or a P domain. Alternative embodiments of the invention may include a Wavelength Division Multiplexing domain (W domain). Some embodiments of the invention may have more than two domains (e.g., a P domain, T domain, and W domain).

In some embodiments of the invention, P node 700 determines the packet type based on information obtained from packet header 810 including information from the protocol field, source port field, and the destination port field. P node 700 may classify a packet as being one of: routing, signaling, management, ping, and IP data traffic as shown in FIG. 8. Alternative embodiments of the invention may classify packets into different categories and employ more or fewer packet types.

A person of ordinary skill in the art appreciates that according to widely implemented transport layer protocols, particular functions are associated with particular protocol numbers and particular port numbers. FIG. 8 illustrates that P node 700 may determine a packet's "packet type" based on a transport layer protocol's association between functions and protocol and port numbers. Table 2 illustrates the packet type classifications made by an embodiment of P node 700 based on transport layer information obtained from packet header 810.

TABLE 2

| Packet Type | Processes Implementing |
| --- | --- |
| Routing | Open Shortest Path First (OSPF) |
| Signaling | Multi-protocol Label Switching Resource ReserVation Protocol - Traffic Engineering (MPLS RSVP-TE) |
| Management | Telecommunications Network (Telnet) File Transfer Protocol (FTP) Transaction Language 1 (TL1) |

Referring again to FIG. 8, table 820 illustrates how P node 700 uses particular FIBs to forward particular classes of traffic, in an embodiment of the invention. As illustrated in FIG. 8, routing traffic may be forwarded using the G-FIB because a single instance of a routing protocol is implemented across the P and T domains. In an embodiment of the invention, signaling traffic that is directed at another P node may traverse only P nodes (with an exception to be discussed next), since MPLS tunnels cannot traverse non IP-capable links. Thus, signaling traffic may use the P-FIB for forwarding. An exception to using the P-FIB to forward signal traffic may be made for signaling traffic that is exchanged between two border P nodes for the purpose of setting up a forwarding adjacency between the nodes. Such traffic may be explicitly routed over T domain nodes, and so should be forwarded using the T-FIB at the first P node. (Note that subsequent nodes, being T nodes, would automatically use the T-FIB for forwarding such traffic, until the packet emerges at the border P node at the far end.)

All management traffic destined to a T node may be routed using the G-FIB, in an embodiment of the invention, if that link happens to fall on the shortest path. An implicit assumption in the above, of course, is that there are no malicious users in the network who open a Telnet or an FTP session to an IPCC address with the intent of congesting IPCC bandwidth. That is, all Telnet, FTP, or other management traffic destined to a T domain address is assumed to be valid, low-bandwidth traffic, in an embodiment of the invention. For management traffic destined to a P node, it is preferable that no IPCC links be used (because of the possible limited bandwidth of the IPCC links and the resultant potential for non-T domain related Telnet and FTP applications to clog the IPCC links). Thus, for such traffic P node 700 may consult the P-FIB. The forwarding of IP data traffic (which may have a destination address in the P domain) should not use any IPCC links due to their possible limited bandwidth, in an embodiment of the invention. To forward such traffic, the node may use the P-FIB, which is derived from information pertaining to P-links.

The ping packets are treated differently from other management applications, for the following reason. In a traditional IP network, the control plane and data plane topologies are identical, since each IP link carries both control and data traffic. Ping can thus be used to troubleshoot both IP control-plane and IP data-plane connectivity in a network. In a peer network, however, the presence of IPCC links makes the topology of the control plane a superset of that of the IP data plane. Ideally, therefore, we would require two separate versions of ping, one to test IP control channel reachability and the other to test IP data channel reachability. One version of ping that would use the IP topology to route ping packets, and another version of ping that would only use P links (and not IPCC links). Adding a new ping-like protocol that would provide dataplane connectivity for just the peer model operation is probably impractical. So we propose using ping to test only control plane reachability. This means that all ping packets must be routed using the G-FIB, in an embodiment of the invention. This implies that even if there is no P link between two routers connected with IPCC links, ping packets will use the IPCC links to successfully travel between the nodes.

T Node Architecture and Processes

Figure 9:
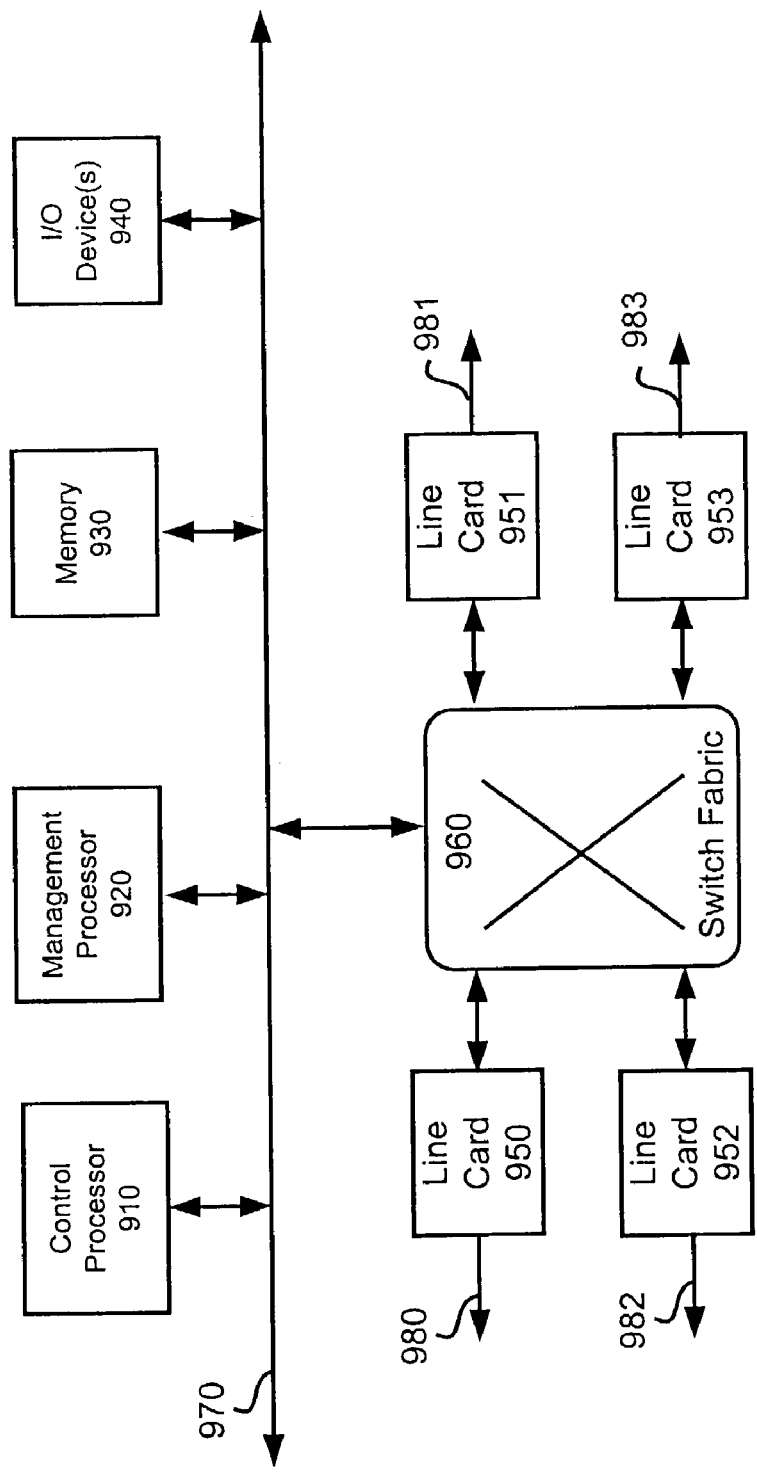
FIG. 9 is block diagram illustrating selected elements of T node 900.

FIG. 9 is a block diagram illustrating selected elements of T node 900. T node 900 may include: one or more control processors 910, one or more management processors 920, memory 930, one or more Input/Output interfaces 940, line cards 950-953, and switch fabric 960. The illustrated elements may be connected together through system interconnect 970. One or more control processors 910 and one or more management processors 920 may include a microprocessor, microcontroller, field programmable gate array (FPGA), application specific integrated circuit (ASIC), central processing unit (CPU), programmable logic device (PLD), and similar devices that access instructions from system storage (e.g., memory 930), decode them, and execute those instructions by performing arithmetic and logical operations. In some embodiments of the invention, one or more control processors 910 and one or more management processors 920 are implemented with a common processor or processors.

Memory 930 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 930 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 930 may store program modules such as routines, programs, objects, images, data structures, program data, and other program components that perform particular tasks or implement particular abstract data types that facilitate system use.

Line cards 950-953 provide an interface between communication channels 980-983 and other elements of T node 900. Line cards 950-953 represent a broad range of interface elements capable of providing transmitting and/or receiving ports connecting T node 900 to communication channels 980-983. A person of ordinary skill in the art will appreciate that the number of line cards in T node 900 may be fewer or greater than the number shown in FIG. 9.

Switch fabric 960 provides the interconnect architecture used to switch frames from incoming communication channels (e.g., 980 and 982) with outgoing communication channels (e.g., 981 and 983). Switch fabric 960 represents a wide array of interconnect architectures capable of switching TDM frames. Switch fabrics are well known in the art and, therefore, will not be further described except as to embodiments of the invention.

One or more I/O interfaces 940 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnect 970 permits communication between the various elements of P node 900. System interconnect 970 may include a wide variety of signal lines including one or more of a memory bus, peripheral bus, local bus, host bus, bridge, optical, electrical, acoustical, and other propagated signal lines.

T node 900 may receive one or more Link State Advertisement (LSA) messages via IPCC 980. The LSA messages may contain information about one or more links that are in the same network as T node 900. IPCC 980 may be a low bandwidth tunnel in some embodiments of the invention. In alternate embodiments of the invention, IPCC 980 may be implemented with IP over Data Communication Channel (DCC). In embodiments of the invention employing a link-state routing protocol, T node 900 may maintain one or more Link State Databases (LSDBs) containing information from the one or more received LSA messages.

In some embodiments of the invention, T node 900 maintains separate LSDBs for LSA messages pertaining to P links and LSA messages pertaining to IPCC links. In such embodiments, T node 900 may derive separate FIBs for each LSDB it maintains. In alternative embodiments of the invention, T node 900 maintains a global LSDB and generates separate FIBs by running a CSPF algorithm on subsets of the global LSDB.

In either case, T node 900 may generate a G-FIB and a T-FIB, in an embodiment of the invention. The T-FIB may be derived from LSA messages pertaining to IPCC links. The G-FIB may be derived from a union of the LSA messages pertaining to P links with the LSA messages pertaining to IPCC links. In some embodiments of the invention, the G-FIB is derived by running a CSPF algorithm on the global LSDB.

Figure 10:
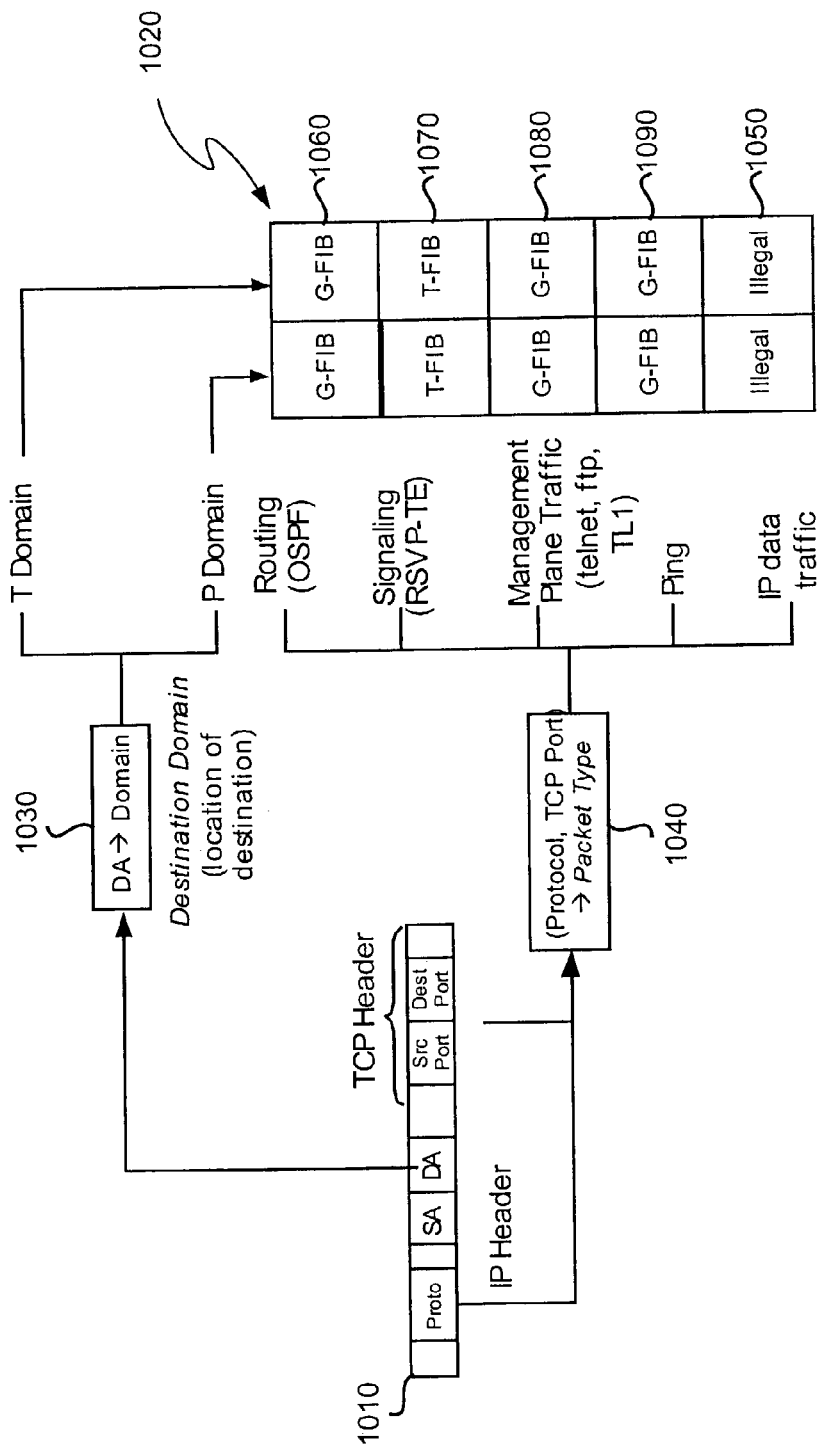
FIG. 10 is an illustration of packet classification and processing within a T node.

FIG. 10 illustrates how an embodiment of T node 900 classifies and forwards various types of packets. FIG. 10 shows packet header 1010, table 1020, obtained domain information 1030, and obtained packet type 1040. In some embodiments of the invention, T node 900 classifies received packets based on information obtained from the IP and TCP (or User Datagram Protocol) headers of the packet. Specifically, some embodiments of the invention determine the traffic class of a packet based on the domain in which the destination node resides and the packet type. T node 900 may determine the packet type and the domain in which the destination node resides using analogous techniques to processes described with regards to P node 700 and FIG. 8.

Table 1020 provides an example of how T node 900 may use different FIBs to forward different classes of traffic. Reference numeral 1050 illustrates that T node 900 does not forward IP data packets to P nodes, in an embodiment of the invention. Since T node 900 does not typically forward IP data packets to P nodes, T node 900 does not need a P-FIB. If the P nodes are implemented according to the discussion associated with FIGS. 8 and 9, IP data traffic should not reach T node 900. Reference numeral 1060 illustrates that routing traffic may be forwarded using the G-FIB, in an embodiment of the invention.

Similarly, signaling traffic destined to P nodes typically does not reach T node 900, in an embodiment of the invention. An exception, however, is signaling traffic used to establish a forwarding adjacency between two P nodes across the T domain (e.g., GMPLS signaling traffic). Since such traffic is normal signaling traffic as far as the T domain is concerned, it may be forwarded using the T-FIB.

In an embodiment of the invention, signaling traffic destined to a T node may be forwarded using the T-FIB, since it is preferable for such traffic to travel over IPCC links. In an embodiment of the invention, T domain destined signaling traffic should not be forwarded over P links since the circuit being established by such signaling will only traverse T links. Thus, in some embodiments of the invention, the corresponding signaling traffic (e.g., Resource Reservation Protocol messages) also should be restricted to following the same sequence of T nodes through which the data-forwarding path passes.

Reference numeral 1080 illustrates that all management traffic (e.g., Telnet, FTP, or TL1 commands) whether destined to a P or T node may be routed using the G-FIB. Similarly, reference numeral 1090 illustrates that Ping traffic in the T domain may follow the same forwarding rules as other management traffic. In other words, the G-FIB is used for routing ping packets. Note that any ping traffic originating from a T domain of necessity only tests control plane connectivity (there is no way for T nodes to test IP data forwarding plane connectivity) so, unlike the P domain, there is no issue with using the G-FIB to route ping packets.

Routing Protocol Enhancements

In an embodiment of the invention, nodes within a peer type network (e.g., P node 310 and T node 320 shown in FIG. 3) are able to select between forwarding packets over P links or IPCC links. It is desirable to consider link type when routing packets in a peer type network because some traffic classes may only traverse certain types of links. Also, it is desirable to consider link type when routing packets in a peer type network because IPCC links are typically low bandwidth and therefore data traffic should be routed over P links instead of IPCC links. Thus, it is desirable to enhance routing protocols used in peer type networks so that the routing protocols enable nodes within a network to distinguish between P links and IPCC links (as well as W links). More specifically, in embodiments of the invention using link-state routing protocols, it is desirable for receiving nodes to be able to differentiate between OSPF LSA messages describing IPCC links from OSPF LSA messages describing P links.

Figure 11:
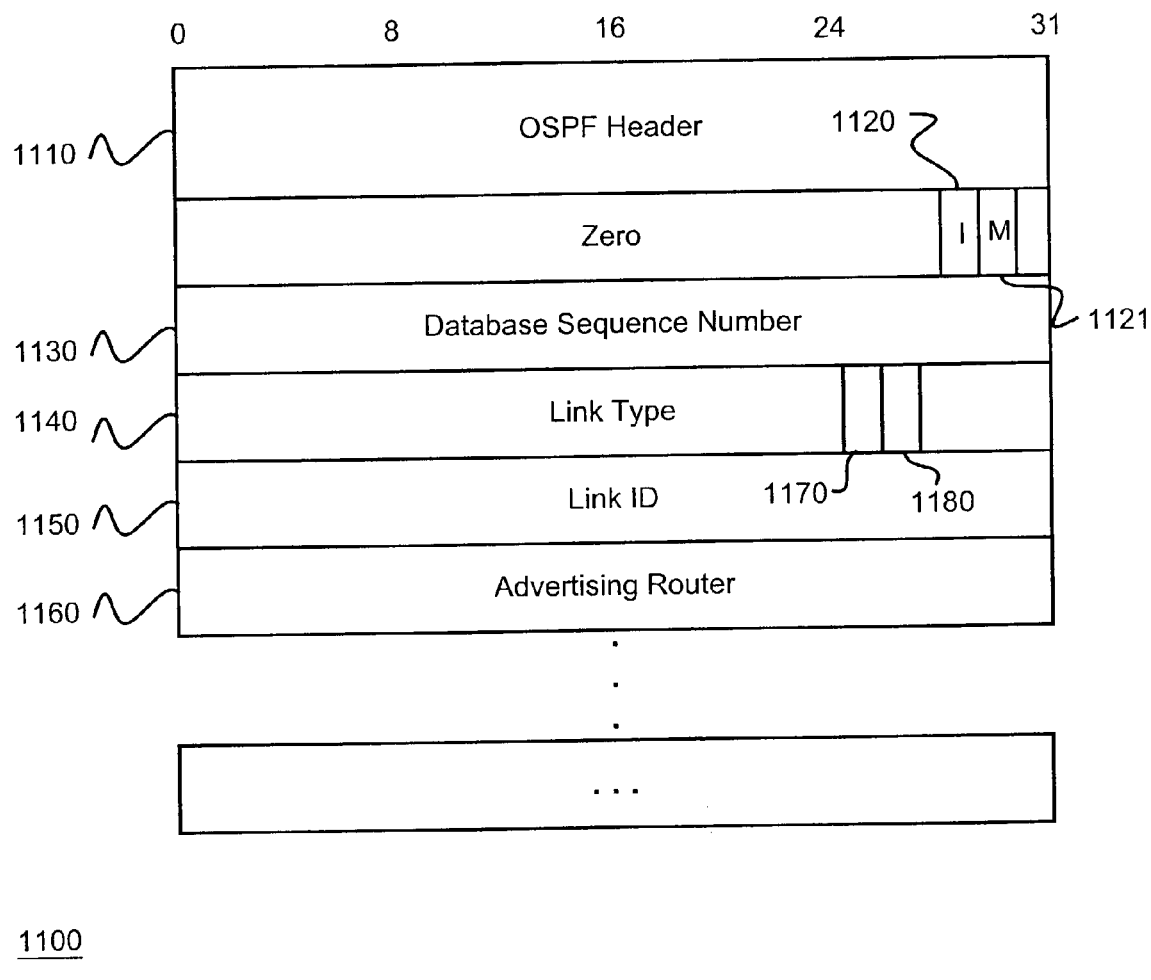
FIG. 11 is a block diagram illustrating selected portions of LSA 1100

FIG. 11 is a block diagram illustrating selected portions of LSA message 1100. LSA message 1100 comprises a number of fields including OSPF header 1110, database sequence number 1130, link type 1140, link identifier 1150, and advertising router 1160. Routers and switches in a peer type network may send messages like LSA message 1100 to exchange topology information. Reference numeral 1110 illustrates that LSA message 1100 typically includes a header. Header 1110 may specify, inter alia, the IP address of the router (or switch) that generated LSA message 1100 as well as the version of the link-state routing protocol that was used.

Bit I shown at reference numeral 1120 may be used to indicate whether LSA message 1100 is the first in a series of LSA messages. It may be necessary to send a series of LSA messages if, for example, a router is conveying a large topology database. Bit M shown at reference numeral 1121 may be used to indicate whether additional LSA messages follow LSA message 1100. Field 1130 may be used to number LSA message 1100 so that the receiving node can track whether it is receiving an entire sequence of LSA messages. Fields 1140, 1150, and 1160 may be used to describe one link in a network and may be repeated for each described link.

Link Type field 1140 may include Link Type bit(s) 1170. Link Type bit(s) 1170 may be used to indicate whether the described link is a P link or an IPCC link, in an embodiment of the invention. The node sending LSA message 1100 may write either a 1 or a 0 to Link Type bit(s) 1170 to indicate whether the described link is a P link or an IPCC, in an embodiment of the invention. In some embodiments of the invention, Link Type bit(s) 1170 comprises two or more bits. For example, in an embodiment of the invention with three domains (e.g. a P domain, a T domain, and a W domain), Link Type bits(s) 1170 may comprise two bits. While Link Type bit(s) 1170 is illustrated as being toward the end of Link Type field 1150, a person of ordinary skill in the art will appreciate that any bit(s) of Link Type 1140 may be used for Link Type bit(s) 1170. In alternative embodiments of the invention, Link Type bit(s) 1170 may be in a different field of LSA message 1100.

Link Type field 1140 may also include Domain Type bit(s) 1180. Domain Type bit(s) 1180 may be used to indicate whether the node sending LSA message 1100 resides in a P domain or a T domain (or another domain type), in an embodiment of the invention. For example, the sending node may write either a 1 or a 0 to Domain Type bit(s) 1180 to indicate that the sending node resides in either a P domain or a T domain. In some embodiments of the invention, Domain Type bit(s) 1180 comprises two or more bits. Also, while the illustrated embodiment shows Domain Type bit(s) 1180 as being in the upper portion of Link Type field 1140, a person of ordinary skill in the art will appreciate that Domain Type bit(s) 1180 may be located in another part of Link Type field 1140. In alternative embodiments of the invention, Domain Type bit(s) 1180 may be located in a different field of LSA message 1100.

In an embodiment of the invention, Link Type bit(s) 1170 enable a receiving node to differentiate between OSPF LSA messages describing IPCC links from LSA messages describing P links. Since the receiving node can differentiate between LSA messages based on the link type of the described link, it can keep the two (or more) types of LSA messages separate. As described earlier with regards to FIGS. 7-10, a receiving node may keep different types of LSA messages separate by placing them in logically distinct Link Status Databases (LSDBs) describing the IP topology, P domain topology, and T domain topology of a network, respectively.

Description of Flow Charts

Turning now to FIGS. 12-17, the particular methods associated with embodiments of the invention are described in terms of computer software and hardware with reference to flowcharts. The methods to be performed by elements of a peer type network constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a node) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Figures 12, 13:
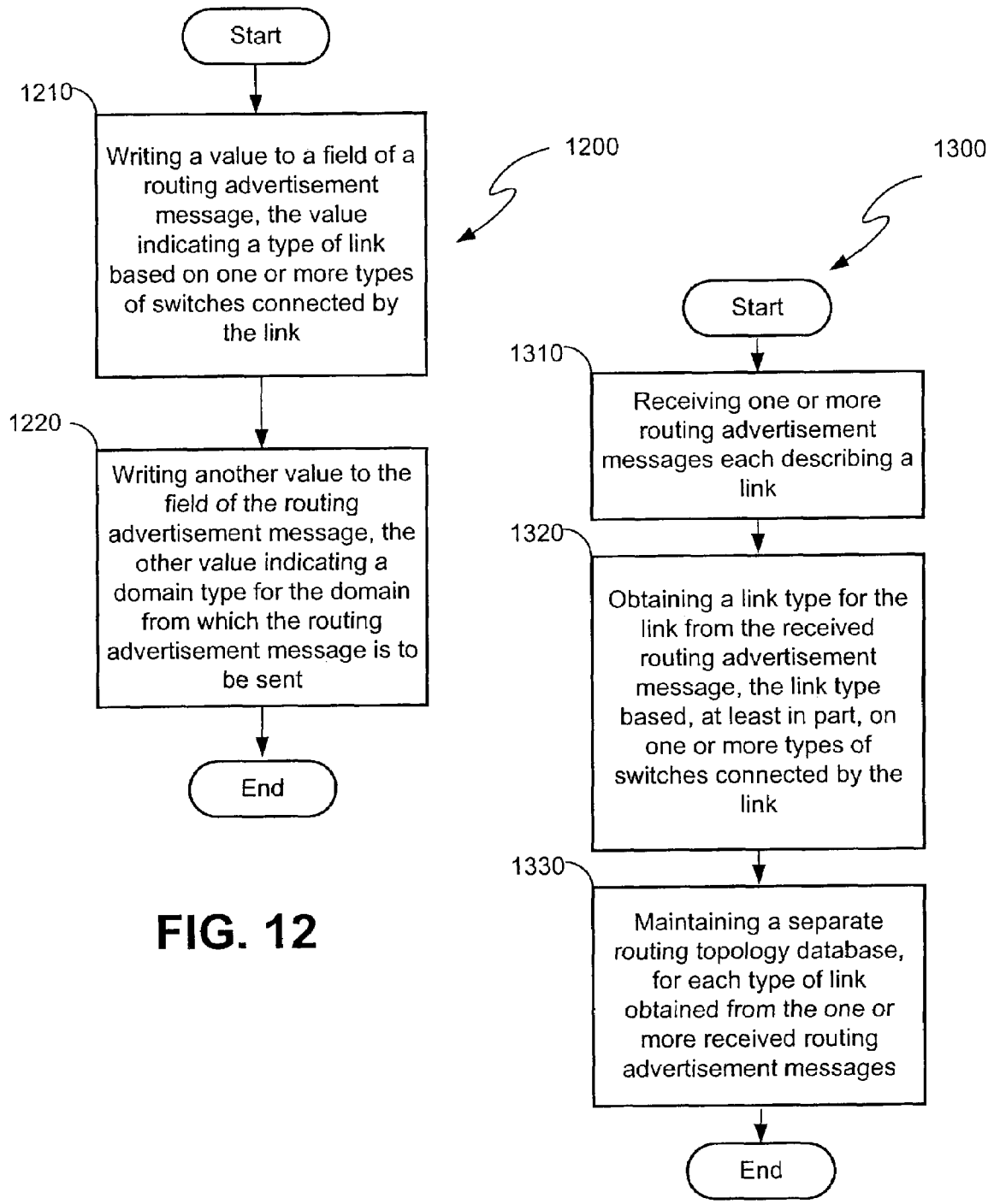
FIG. 12 is a flow diagram illustrating certain aspects of a method for generating a routing advertisement message, according to an embodiment of the invention.
FIG. 13 is a flow diagram illustrating certain aspects of a method for processing routing advertisement messages, according to an embodiment of the invention.

FIG. 12 is a flow diagram illustrating certain aspects of a method for generating a routing advertisement message according to an embodiment of the invention. Referring to process block 1210, in one embodiment, a node (e.g., P node 310 and T node 320 shown in FIG. 3) writes a value indicating a type of link to a field of a routing advertisement message. The value indicating a type of link may be based on one or more types of switches connected by the link. For example, in an embodiment of the invention, a link connecting two IP routers is a type P link. Similarly, a link connecting a TDM switch with one of an IP router and a TDM switch is a type IPCC link, in an embodiment of the invention.

Referring to process block 1220, in one embodiment, a node (e.g., P node 310 and T node 320 shown in FIG. 3) writes a value indicating a domain type to a field of a routing advertisement message. The domain type may specify a type of domain in which the sender resides. For example, in an embodiment of the invention, a node may write a value to the routing advertisement message indicating whether the node resides in a P node or a T node. In some embodiments of the invention, the values indicating link type and domain type are written to a Link Type field of a Router LSA.

FIG. 13 is a flow diagram illustrating certain aspects of a method for processing routing advertisement messages according to an embodiment of the invention. Referring to process block 1310, in one embodiment, a node (e.g., P node 310 and T node 320 shown in FIG. 3) receives one or more routing advertisement messages describing one or more links. In an embodiment of the invention, the node may receive one or more LSA messages over a P link or an IPCC link. The node may obtain a link type from each of the one or more received routing advertisement messages at reference numeral 1320. The link type may be based, at least in part, on one or more types of switches connected by the link.

Referring to process block 1330, in one embodiment, the node maintains a separate routing topology database for each type of link obtained from the one or more received routing advertisement messages. In one embodiment of the invention, the node maintains a first LSDB containing information from received LSA messages describing P links and a second LSDB containing information from received LSA messages describing IPCC links. As will be further described below with reference to FIGS. 14-17, the node may generate different FIBs based on the different LSDBs.

Figure 14:
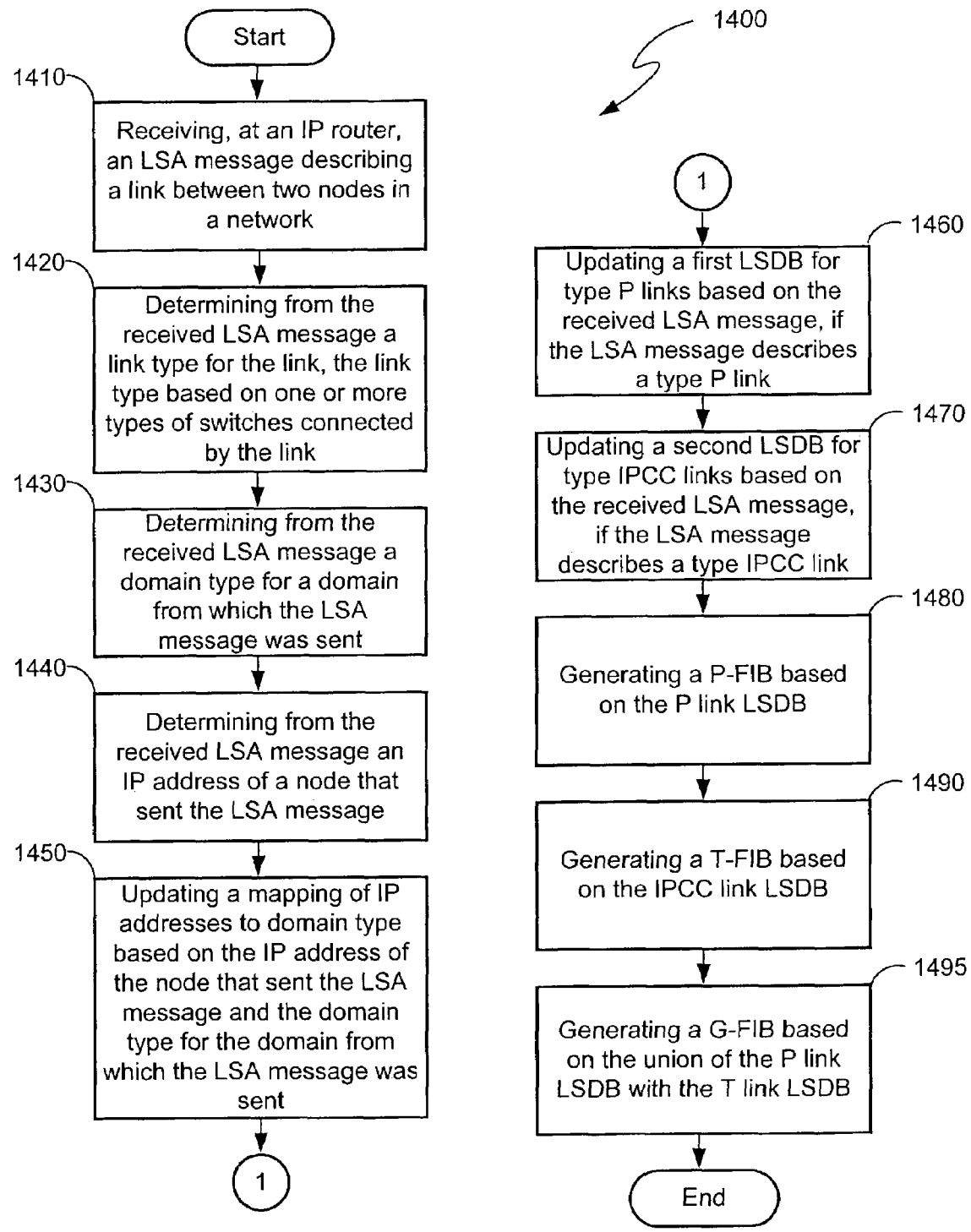
FIG. 14 is a flow diagram illustrating certain aspects of method 1400 for processing Link State Advertisement messages in an Internet Protocol compliant router, according to an embodiment of the invention.

FIG. 14 is a flow diagram illustrating certain aspects of a method 1400 for processing Link State Advertisement messages in an IP router, according to an embodiment of the invention. Referring to process block 1410, in one embodiment, an IP router receives an LSA message describing a link between two nodes in a network. The IP router determines a link type for the link at process block 1420. In an embodiment of the invention, the link type is based on one or more types of switches connected by the link.

The IP router may determine from the received LSA message a domain type from which the LSA message was sent at process block 1430. Similarly, the IP router may determine an IP address of the node that sent the LSA message at process block 1440. Referring to reference numeral 1450, in some embodiments of the invention, the IP router may update a mapping of IP addresses to domain type based on the information determined in process blocks 1430 and 1440. In alternative embodiments of the invention, a mapping of IP address to domain type may be manually configured for the IP router.

In process block 1460, the IP router may update a first LSDB for type P links based on the received LSA message, if the LSA message describes a type P link. Similarly, the IP router may update a second LSDB for type IPCC links, if the LSA message describes a type IPCC link. Thus, in an embodiment of the invention, the IP router maintains at least two logically distinct LSDBs: a P link LSDB and an IPCC link LSDB.

Referring to process block 1480, in an embodiment of the invention, the IP router generates a P link-Forwarding Information Base (P-FIB) based on the P link LSDB. The IP router may use the P-FIB to forward packets over P links. In one embodiment of the invention, the P-FIB is generated by running a Constrained Shortest Path First (CSPF) algorithm on the P link LSDB.

The IP router may generate an IPCC link-FIB (T-FIB) based on the IPCC link LSDB as illustrated at reference numeral 1490. The IP router may use the T-FIB to forward packets over IPCC links. In one embodiment of the invention, the T-FIB is generated by running a CSPF algorithm on the IPCC link LSDB.

Referring to process block 1495, in an embodiment of the invention, the IP router generates a global-FIB (G-FIB) based on the union of the P link LSDB with the IPCC link LSDB. The G-FIB may be used to forward packets over either P links or IPCC links. In one embodiment of the invention, the G-FIB is generated by running a CSPF algorithm on the union of the P links LSDB with IPCC link LSDB.

Figure 15:
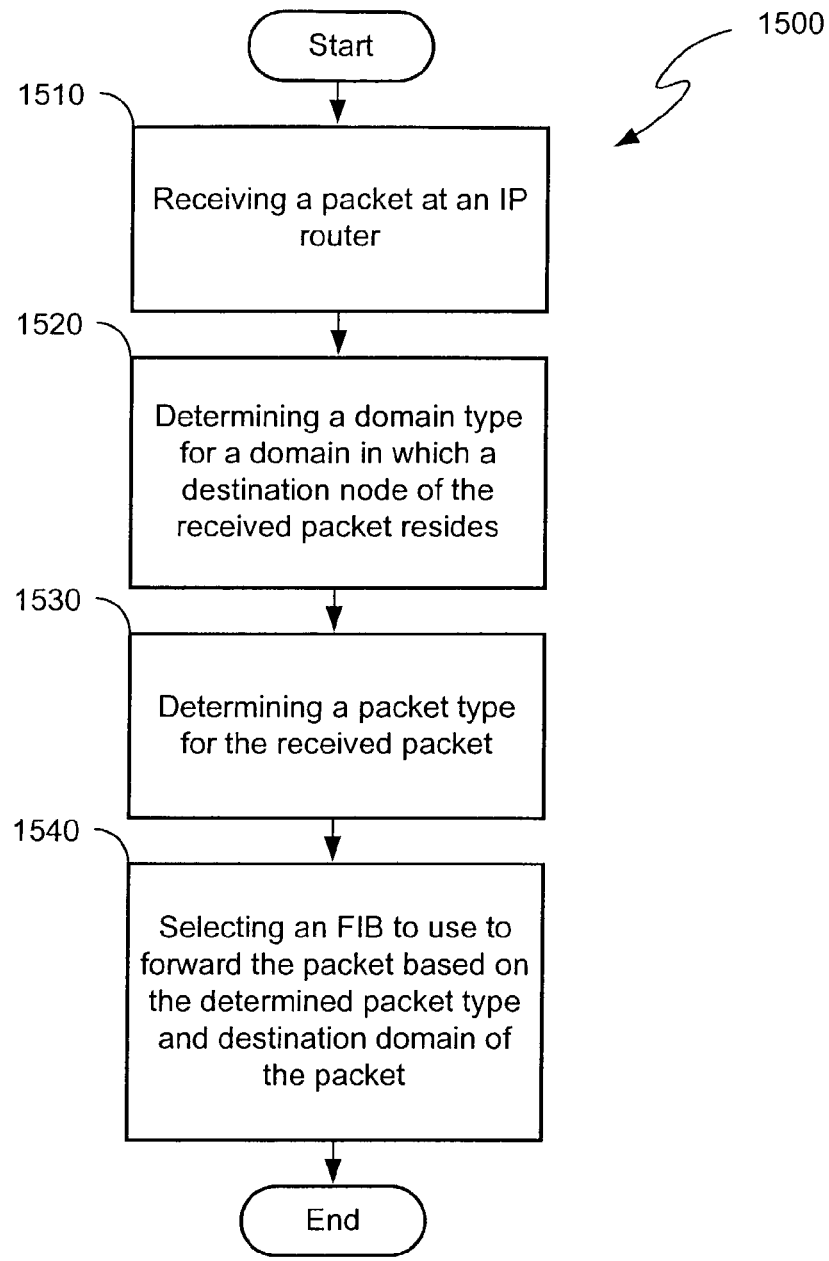
FIG. 15 is a flow diagram illustrating certain aspects of method 1500 for processing a packet in an Internet Protocol compliant router, according to an embodiment of the invention.

FIG. 15 is a flow diagram illustrating certain aspects of a method for processing a packet in an IP router, according to an embodiment of the invention. The IP router receives a packet at process block 1510. Referring to process block 1520 the IP router determines a domain type for a domain in which a destination node of the received packet resides. In one embodiment of the invention, the IP router determines the domain type for the destination node by obtaining the destination IP address from the received packet and comparing it to a mapping of IP addresses to domain types. As previously discussed the mapping of IP addresses to domain types may be automatically generated from information obtained from LSA messages or manually configured at each node.

Referring to process block 1530, in an embodiment of the invention, the IP router determines a packet type for the received packet. The IP router may determine the packet type based, at least in part, on information obtained from various packet headers. For example, in one embodiment of the invention, the IP router determines transport layer protocol type and port information from various packet headers of the received packet. In one embodiment of the invention, the IP router determines the packet type of the received packet to be one of: routing, signaling, management, ping, and IP data traffic.

The IP router determines which FIB to use when forwarding the received packet at reference numeral 1540. In an embodiment of the invention, the IP router may select an FIB based on the determined packet type and destination domain of the packet. For example, the IP router may select the P-FIB to forward an IP data packet, in an embodiment of the invention.

Figure 16:
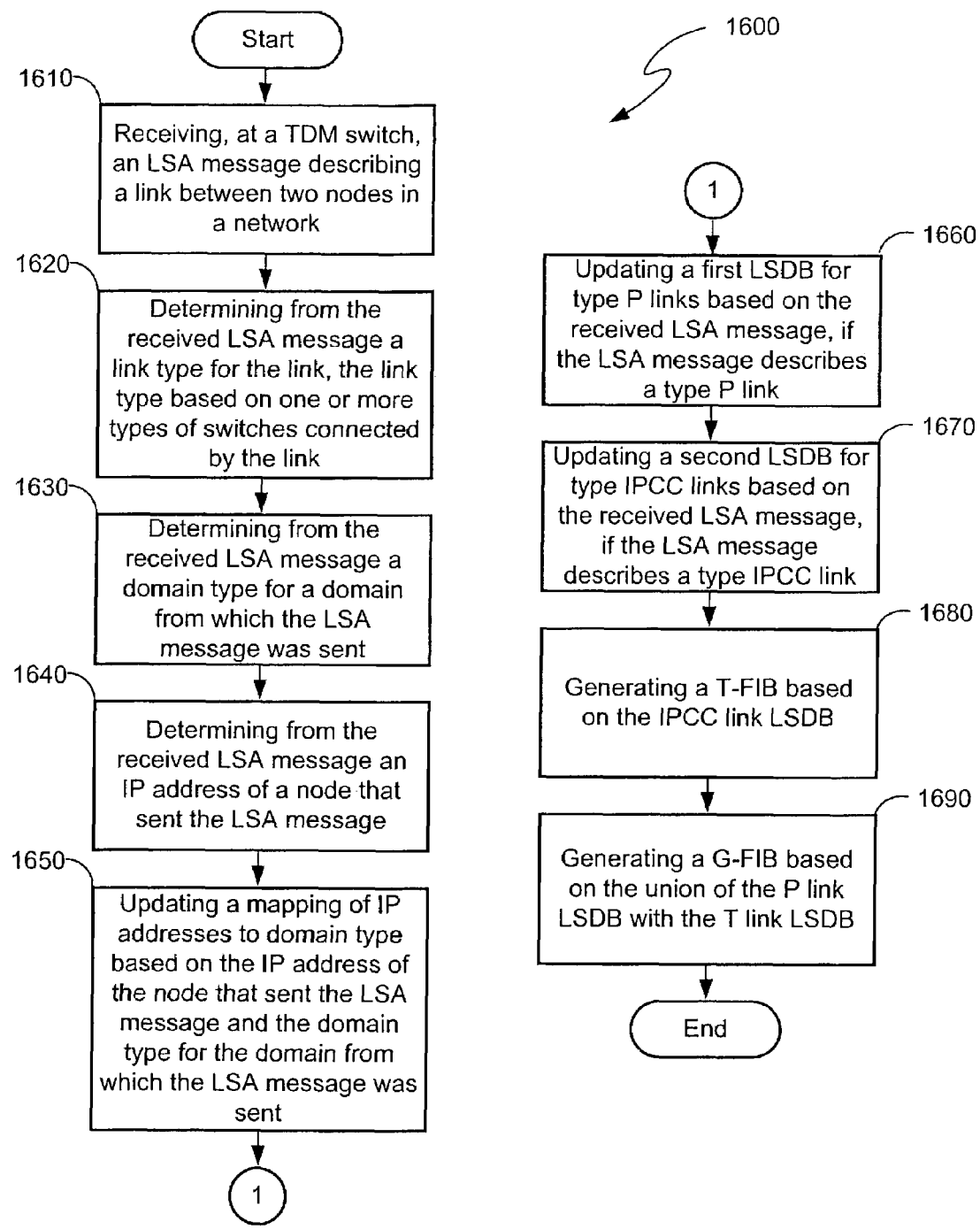
FIG. 16 is a flow diagram illustrating certain aspects of method 1600 for processing Link State Advertisement messages in a Time Division Multiplexing switch, according to an embodiment of the invention.

FIG. 16 is a flow diagram illustrating certain aspects of a method for processing Link State Advertisement (LSA) messages in a TDM switch, according to an embodiment of the invention. Referring to process block 1610, in an embodiment of the invention, a Time Division Multiplexing (TDM) switch receives an LSA message describing a link between two nodes in a network. The TDM switch determines a link type for the link at process block 1630. In an embodiment of the invention, the link type is based on one or more types of switches connected by the link. Process blocks 1630, 1640, and 1650 are similar to process blocks 1430, 1440, and 1450 and, therefore, will not be further described.

In process block 1660, the TDM switch may update a first LSDB for type links based on the received LSA message, if the LSA message describes a type link. Similarly, the TDM switch may update a second LSDB for type IPCC links, if the LSA message describes a type IPCC link. Thus, in an embodiment of the invention, the TDM switch may maintain two or more logically distinct LSDBs. While process 1600 is directed to maintaining a P link LSDB and an IPCC link LSDB, a person of ordinary skill in the art will appreciate that alternative embodiments may maintain a different selection of LSDBs (e.g., a global LSDB and an IPCC LSDB).

Referring to process block 1680, in an embodiment of the invention, the TDM switch generates an IPCC link-Forwarding Information Base (T-FIB) based on the IPCC link LSDB. The TDM switch may use the T-FIB to forward packets over IPCC links, in an embodiment of the invention. In one embodiment, the T-FIB is generated by running a CSPF algorithm on the IPCC link LSDB.

The TDM switch may generate a global-FIB (G-FIB) as illustrated at reference numeral 1690. In an embodiment of the invention, the G-FIB is generated by running a CSPF algorithm on the union of the P link LSDB with the IPCC link LSDB. The G-FIB may be used to forward packets over either P links or IPCC links, in an embodiment of the invention.

Figure 17:
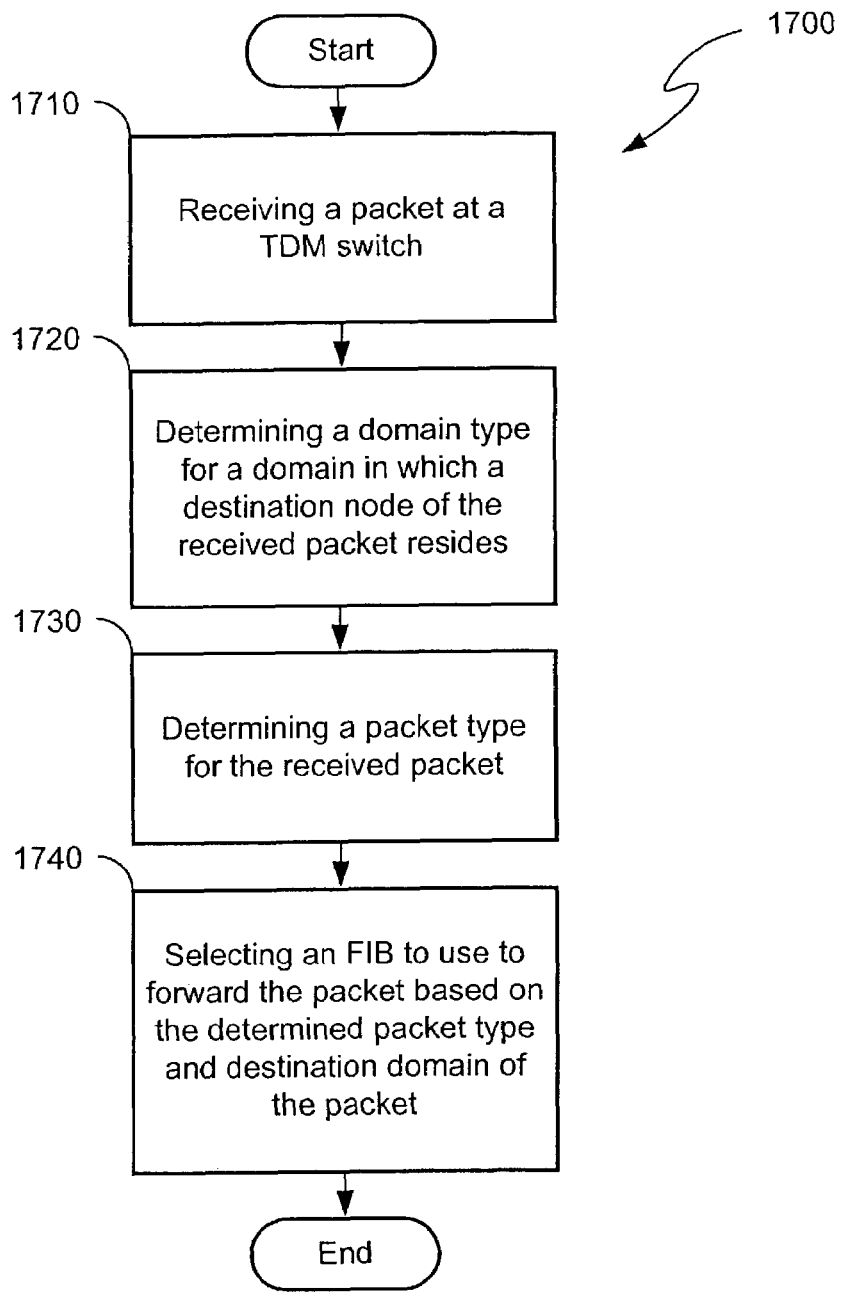
FIG. 17 is a flow diagram illustrating certain aspects of method 1700 for processing a packet in a Time Division Multiplexing switch, according to an embodiment of the invention.

FIG. 17 is a flow diagram illustrating certain aspects of a method for processing a packet in a TDM switch, according to an embodiment of the invention. The TDM switch receives a packet at process block 1710. Referring to process block 1720, the TDM switch determines a domain type for a domain in which a destination node of the received packet resides. In one embodiment of the invention, the TDM switch determines the domain type for the destination node by obtaining the destination IP address from the received packet and comparing it to a mapping of IP addresses to domain types. As previously discussed, the mapping of IP addresses to domain types may be automatically generated from information obtained from LSA messages or manually configured at each node.

Referring to process block 1730, in an embodiment of the invention, the TDM switch determines a packet type for the received packet. The TDM switch may determine the packet type based, at least in part, on information obtained from various packet headers. For example, in one embodiment of the invention, the IP router determines transport layer protocol type and port information from various packet headers of the received packet. In one embodiment of the invention, the TDM switch determines the packet type of the received packet to be one of: routing, signaling, management, ping, and IP data traffic.

The TDM switch determines which FIB to use when forwarding the received packet at reference numeral 1740. In an embodiment of the invention, the TDM switch may select an FIB based on the determined packet type and destination domain of the packet. For example, the TDM switch may select the G-FIB to forward s signaling packet, in an embodiment of the invention.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. An integrated optical network comprising:
   a control plane connecting one or more optical signal switches and one or more electrical signal switches, the control plane to transmit control packets;
   a forwarding plane connecting the optical signal switches and the electrical signal switches, the forwarding plane to transmit data traffic packets; and
   a router communicatively connected with the control plane and the forwarding plane, wherein the router to:
   receive a packet,
   determine a packet type and a destination domain type for the packet, wherein determining the packet type comprises reading an Internet Protocol ("IP") header of the packet to determine a transport layer protocol type for the packet, reading a transport layer header to determine port information for the packet, and determining the packet type based, at least in part, on the transport layer protocol type and the port information, wherein the packet type comprises one of a data traffic packet type or a control packet type,
   select either the forwarding plane or the control plane to transmit the packet based on the packet type,
   select either an optical signal switch or an electrical signal switch to receive the packet based on the destination domain type; and
   send the packet to a destination domain based on the selections.

2. The integrated optical network of claim 1, wherein:
   the one or more optical switches are selected from the group comprising Time Division Multiplexing ("TDM") switches and Wave Division Multiplexing ("WDM") switches; and wherein
   the one or more electrical signal switches comprise IP electrical signal switches.

3. The integrated optical network of claim 2, wherein the control plane comprises:
   an IP Control Channel ("IPCC") having optics-based extensions enabling a single IPCC instance for all electrical signal switches and optical signal switches in the integrated optical network.

4. The integrated optical network of claim 3, wherein the IPCC comprises an optical transport domain, and wherein the router to further compute a single end-to-end path across the optical transport domain for at least a portion of packets received at the router.

5. The integrated optical network of claim 1, wherein the router to further:
   determine whether the destination domain type for a destination IP address of the packet is of an optical signal domain type or an electrical signal domain type based on a mapping of IP addresses to domain types or based on one or more Link State Advertisement (LSA) messages flooded on the integrated optical network or both.

6. The integrated optical network of claim 5, wherein the router to send the packet to the destination domain comprises the router to:
   send the packet to either the control plane or the forwarding plane based on the packet type and the destination domain type.

7. The integrated optical network of claim 6, further comprising:
   an optical signal control link connecting the router with the control plane of the integrated optical network;
   an electrical signal control link connecting the router with the control plane of the integrated optical network;
   an optical signal data link connecting the router with the forwarding plane of the integrated optical network; and
   an electrical signal data link connecting the router with the forwarding plane of the integrated optical network.

8. The integrated optical network of claim 7, wherein the router to send the packet to either the control plane or the forwarding plane based on the packet type and the destination domain type comprises the router to:
   send the packet to the destination domain via the optical signal control link when the packet type is determined to be of the control packet type and when the destination domain type is determined to be of the optical signal domain type;
   send the packet to the destination domain via the electrical signal control link when the packet type is determined to be of the control packet type and when the destination domain type is determined to be of the electrical signal domain type;
   send the packet to the destination domain via the optical signal data link when the packet type is determined to be of the data traffic packet type and when the destination domain type is determined to be of the optical signal domain type; and
   send the packet to the destination domain via the electrical signal data link when the packet type is determined to be of the data traffic packet type and when the destination domain type is determined to be of the electrical signal domain type.

9. The integrated optical network of claim 8, wherein the router to send the packet to either the control plane or the forwarding plane based on the packet type and the destination domain type comprises the router to further:
- select a Forwarding Information Base (FIB) to forward the packet based on the determined packet type and destination domain type of the packet.

10. The integrated optical network of claim 1, wherein the router to send the packet to the destination domain based on the selections comprises the router to:
- select a global Forwarding Information Base (FIB) to send the packet to either an optical signal switch or an electrical signal switch on the control plane when the packet comprises a routing packet;
- select the global FIB to send the packet to either the optical signal switch or the electrical signal switch on the control plane when the packet comprises a control-plane maintenance packet;
- select the global FIB to send the packet to either the optical signal switch on the control plane or an optical signal switch on the forwarding plane when the packet comprises a management packet destined for a optical signal type domain;
- select the global FIB to send the packet to either an electrical signal switch on the control plane or an electrical signal switch on the forwarding plane when the packet comprises a management packet destined for an electrical signal type domain; and
- select an IP FIB to send the packet to the electrical signal switch on the forwarding plane when the packet comprises a data traffic packet destined for an electrical signal type domain.

11. A router comprising:
- means for establishing an optical signal control link and an electrical signal control link with a control plane of an integrated optical network, wherein the optical signal control link comprises a Time Division Multiplexing ("TDM") optical control link or a Wave Division Multiplexing ("WDM") optical control link with the control plane, and wherein the electrical signal control link comprises an Internet Protocol Control Channel ("IPCC") control link with the control plane;
- means for establishing an optical signal data link and an electrical signal data link with a forwarding plane of the integrated optical network, wherein the optical signal data link comprises a TDM optical data link or a WDM optical data link with the forwarding plane, and wherein the electrical signal data link comprises an Internet Protocol ("IP") electrical signal data link with the forwarding plane;
- means for receiving packets via the integrated optical network;
- means for determining a packet type and a destination domain type for each packet received; and
- means for sending each packet received to a destination domain via one of the optical signal control link, the electrical signal control link, the optical signal data link, and the electrical signal data link based on the packet type and the destination domain type determined for each packet.

12. The router of claim 11, wherein:
- establishing the optical signal control link comprises establishing a Time Division Multiplexing ("TDM") optical control link or a Wave Division Multiplexing ("WDM") optical control link with the control plane;
- establishing the electrical signal control link comprises establishing an IP Control Channel ("IPCC") control link with the control plane;
- establishing the optical signal data link comprises establishing a TDM optical data link or a WDM optical data link with the forwarding plane; and wherein
- establishing the electrical signal data link comprises establishing an IP electrical signal data link with the forwarding plane.

13. The router of claim 11, wherein sending each packet received to the destination domain based on the packet type and the destination domain type determined for each packet comprises:
- sending a received packet to the destination domain via the optical signal control link when the packet type is determined to be of a control packet type and when the destination domain type is determined to be of an optical signal domain type;
- sending the received packet to the destination domain via the electrical signal control link when the packet type is determined to be of the control packet type and when the destination domain type is determined to be of an electrical signal domain type;
- sending the received packet to the destination domain via the optical signal data link when the packet type is determined to be of a data traffic packet type and when the destination domain type is determined to be of the optical signal domain type; and
- sending the received packet to the destination domain via the electrical signal data link when the packet type is determined to be of the data traffic packet type and when the destination domain type is determined to be of the electrical signal domain type.

14. A router having instructions stored thereon that, when executed by a processor, cause the processor to perform operations comprising:
- establishing an optical signal control link and an electrical signal control link with a control plane of an integrated optical network, wherein the optical signal control link comprises a Time Division Multiplexing ("TDM") optical control link or a Wave Division Multiplexing ("WDM") optical control link with the control plane, and wherein the electrical signal control link comprises an Internet Protocol Control Channel ("IPCC") control link with the control plane;
- establishing an optical signal data link and an electrical signal data link with a forwarding plane of the integrated optical network, wherein the optical signal data link comprises a TDM optical data link or a WDM optical data link with the forwarding plane, and wherein the electrical signal data link comprises an Internet Protocol ("IP") electrical signal data link with the forwarding plane;
- receiving packets from the integrated optical network;
- determining a packet type and a destination domain type for each packet received; and
- sending each packet received to a destination domain via one of the optical signal control link, the electrical signal control link, the optical signal data link, and the electrical signal data link based on the packet type and the destination domain type determined for each packet.

15. The router of claim 14, wherein sending each packet received to the destination domain based on the packet type and the destination domain type determined for each packet comprises:
- sending a received packet to the destination domain via the optical signal control link when the packet type is determined to be of a control packet type and when the destination domain type is determined to be of an optical signal domain type;

sending the received packet to the destination domain via the electrical signal control link when the packet type is determined to be of the control packet type and when the destination domain type is determined to be of an electrical signal domain type;

sending the received packet to the destination domain via the optical signal data link when the packet type is determined to be of a data traffic packet type and when the destination domain type is determined to be of the optical signal domain type; and sending the received packet to the destination domain via the electrical signal data link when the packet type is determined to be of the data traffic packet type and when the destination domain type is determined to be of the electrical signal domain type.

16. A method in a router, comprising:

establishing an optical signal control link and an electrical signal control link with a control plane of an integrated optical network, wherein the optical signal control link comprises a Time Division Multiplexing ("TDM") optical control link or a Wave Division Multiplexing ("WDM") optical control link with the control plane, and wherein the electrical signal control link comprises an Internet Protocol Control Channel ("IPCC") control link with the control plane;

establishing an optical signal data link and an electrical signal data link with a forwarding plane of the integrated optical network, wherein the optical signal data link comprises a TDM optical data link or a WDM optical data link with the forwarding plane, and wherein the electrical signal data link comprises an Internet Protocol ("IP") electrical signal data link with the forwarding plane;

receiving packets from the integrated optical network;

determining a packet type and a destination domain type for each packet received; and sending each packet received to a destination domain via one of the optical signal control link, the electrical signal control link, the optical signal data link, and the electrical signal data link based on the packet type and the destination domain type determined for each packet.

17. The method of claim 16, wherein sending each packet received to the destination domain based on the packet type and the destination domain type determined for each packet comprises:

sending a received packet to the destination domain via the optical signal control link when the packet type is determined to be of a control packet type and when the destination domain type is determined to be of an optical signal domain type;

sending the received packet to the destination domain via the electrical signal control link when the packet type is determined to be of the control packet type and when the destination domain type is determined to be of an electrical signal domain type;

sending the received packet to the destination domain via the optical signal data link when the packet type is determined to be of a data traffic packet type and when the destination domain type is determined to be of the optical signal domain type; and sending the received packet to the destination domain via the electrical signal data link when the packet type is determined to be of the data traffic packet type and when the destination domain type is determined to be of the electrical signal domain type.

18. The method of claim 16, wherein the IPCC control link with the control plane comprises:

optics-based extensions enabling a single IPCC instance for all electrical signal switches and optical signal switches in the integrated optical network.

19. The method of claim 18, wherein the IPCC control link further comprises an optical transport domain, and wherein the method further comprises:

computing a single end-to-end path across the optical transport domain for at least a portion of packets received from the integrated optical network.

20. The method of claim 16, further comprising:

determining whether the destination domain type for a destination IP address of each packet is of an optical signal domain type or an electrical signal domain type based on a mapping of IP addresses to domain types or based on one or more Link State Advertisement (LSA) messages flooded on the integrated optical network or both.

21. The method of claim 16, wherein sending each packet received to the destination domain based on the packet type and the destination domain type determined for each packet comprises:

selecting a Forwarding Information Base (FIB) to forward the packet based on the determined packet type and destination domain type of the packet.

22. The integrated optical network of claim 16, wherein sending each packet received to the destination domain based on the packet type and the destination domain type determined for each packet comprises:

selecting a global Forwarding Information Base (FIB) to send the packet to either an optical signal switch or an electrical signal switch on the control plane when the packet comprises a routing packet;

selecting the global FIB to send the packet to either the optical signal switch or the electrical signal switch on the control plane when the packet comprises a control-plane maintenance packet;

selecting the global FIB to send the packet to either the optical signal switch on the control plane or an optical signal switch on the forwarding plane when the packet comprises a management packet destined for a optical signal type domain;

selecting the global FIB to send the packet to either an electrical signal switch on the control plane or an electrical signal switch on the forwarding plane when the packet comprises a management packet destined for an electrical signal type domain; and selecting an IP FIB to send the packet to the electrical signal switch on the forwarding plane when the packet comprises a data traffic packet destined for an electrical signal type domain.

* * * * *